Feb. 9, 1965 D. CLEJAN 3,168,877
FREIGHT TRANSPORTATION SYSTEMS
Filed Nov. 29, 1962 9 Sheets-Sheet 2
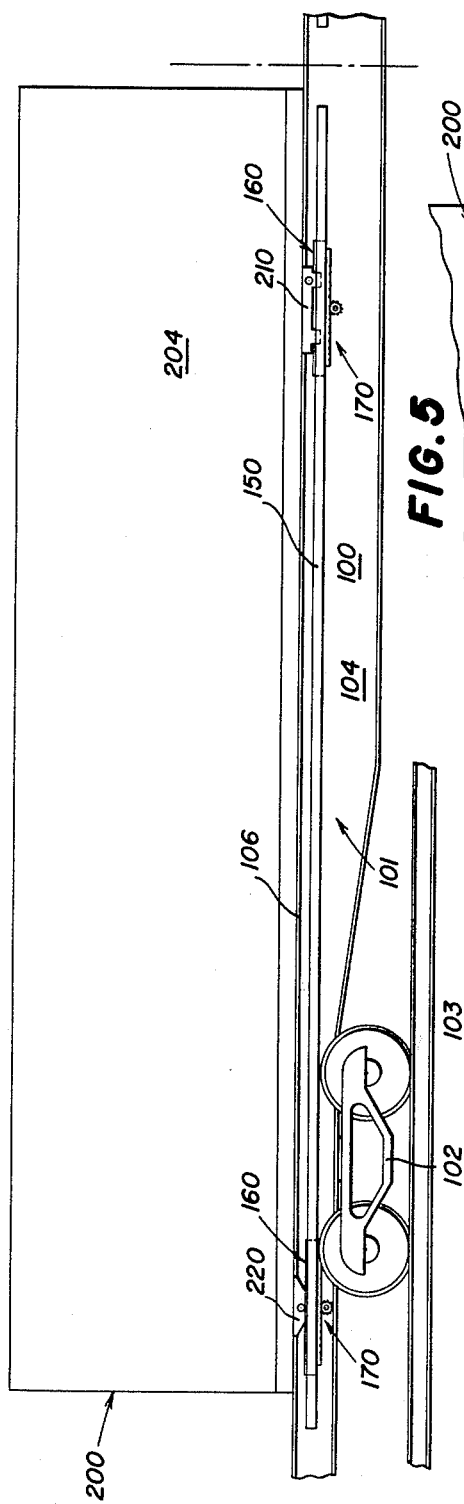
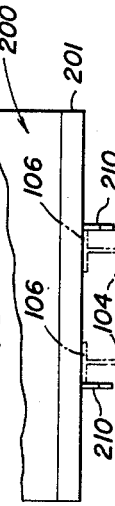
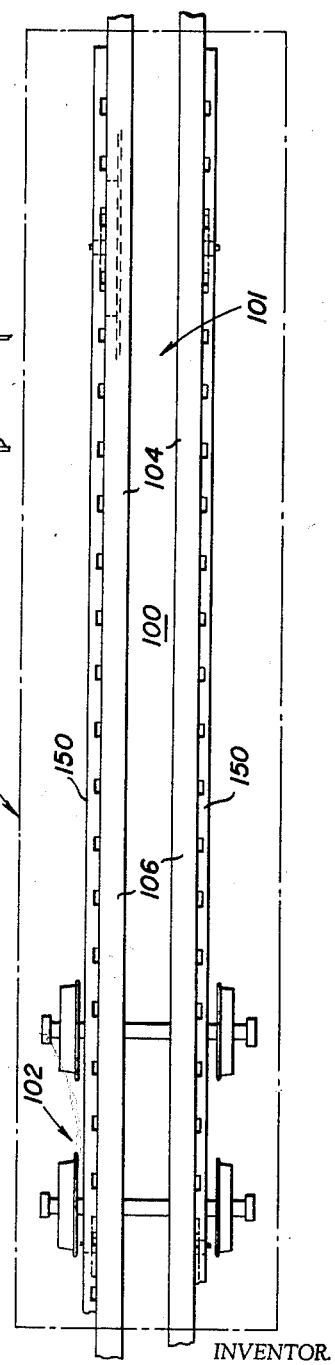
INVENTOR.
DEODAT CLEJAN
BY
Prangley, Baird, Clayton,
Miller & Vogel,
ATTYS.

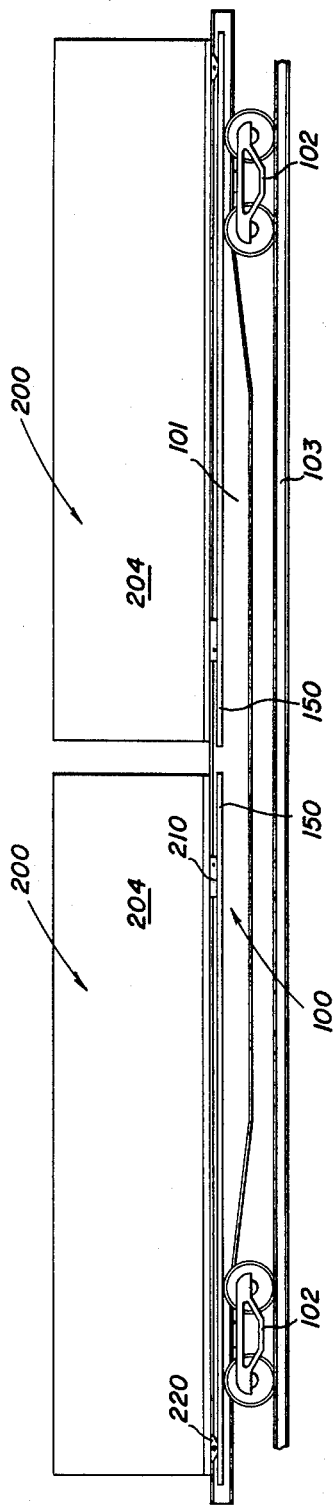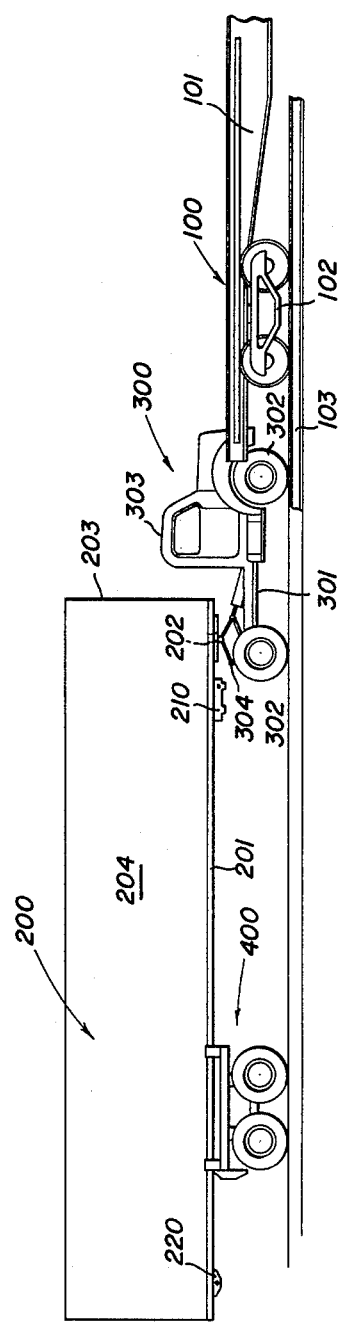

Feb. 9, 1965  D. CLEJAN  3,168,877
FREIGHT TRANSPORTATION SYSTEMS
Filed Nov. 29, 1962  9 Sheets-Sheet 3
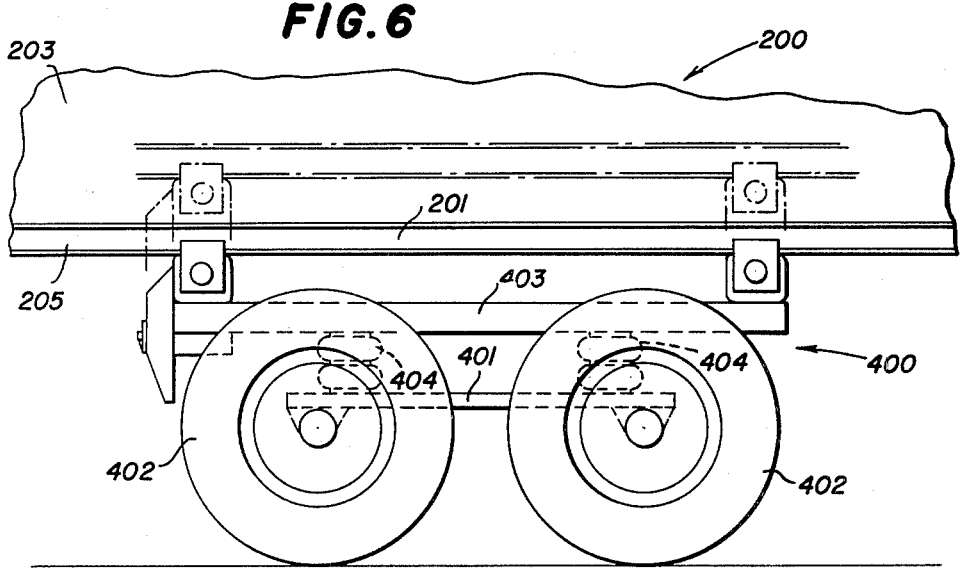
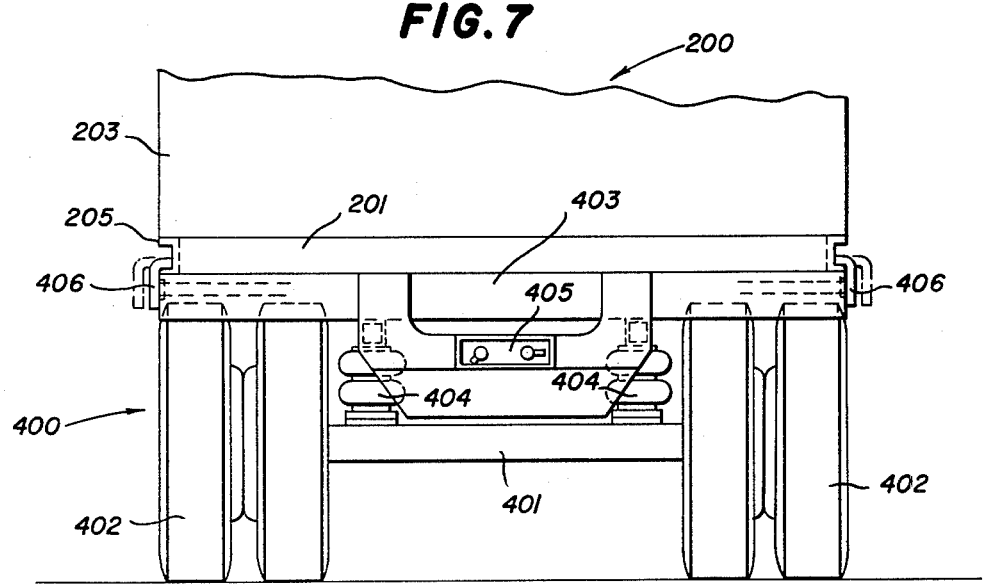
INVENTOR.
DEODAT CLEJAN
BY Prangley, Baird, Clajin, Miller & Vogel,
ATTYS.

Feb. 9, 1965   D. CLEJAN   3,168,877
FREIGHT TRANSPORTATION SYSTEMS
Filed Nov. 29, 1962   9 Sheets-Sheet 4

INVENTOR.
DEODAT CLEJAN
BY
*Cranley Baird, Clayton,
Miller & Vogel,*
ATTYS.

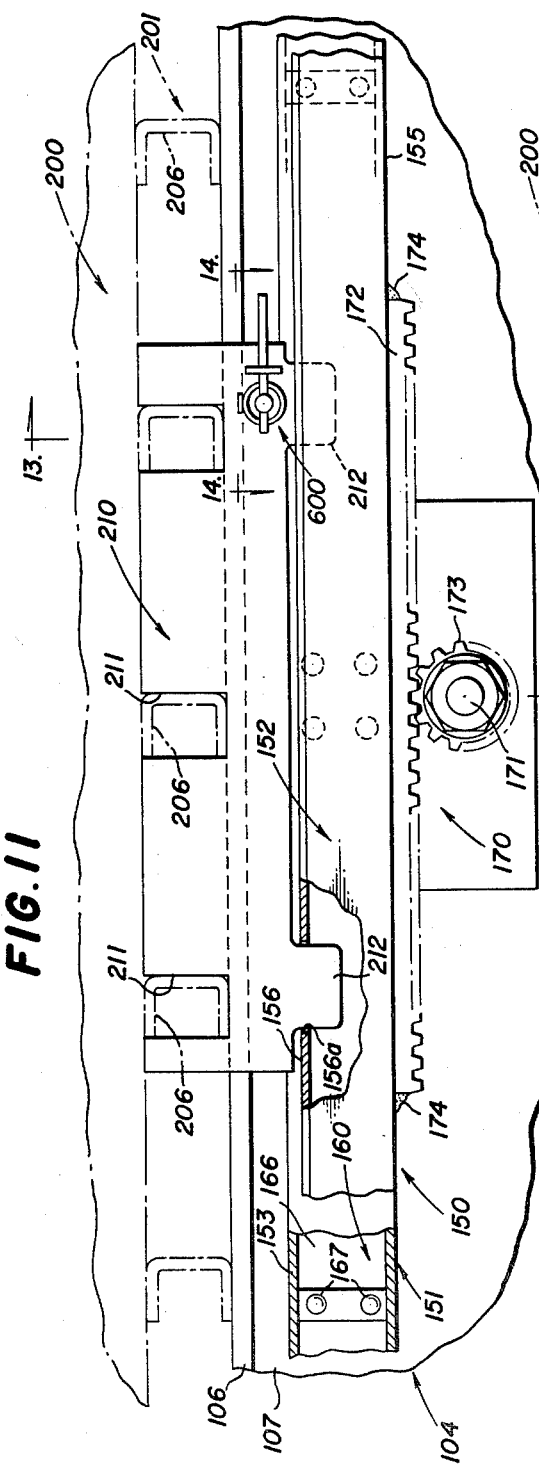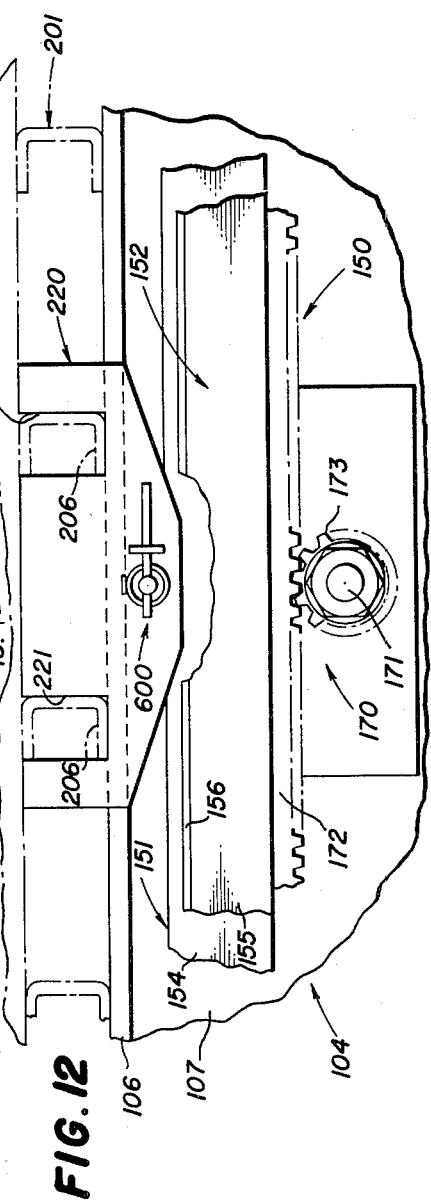

Feb. 9, 1965 D. CLEJAN 3,168,877
FREIGHT TRANSPORTATION SYSTEMS
Filed Nov. 29, 1962 9 Sheets-Sheet 6

INVENTOR.
DEODAT CLEJAN
BY
Pendey, Baird, Clayton,
Miller & Vogel,
ATTYS.

Feb. 9, 1965 D. CLEJAN 3,168,877
FREIGHT TRANSPORTATION SYSTEMS
Filed Nov. 29, 1962 9 Sheets-Sheet 7

INVENTOR.
DEODAT CLEJAN
BY
ATTYS.

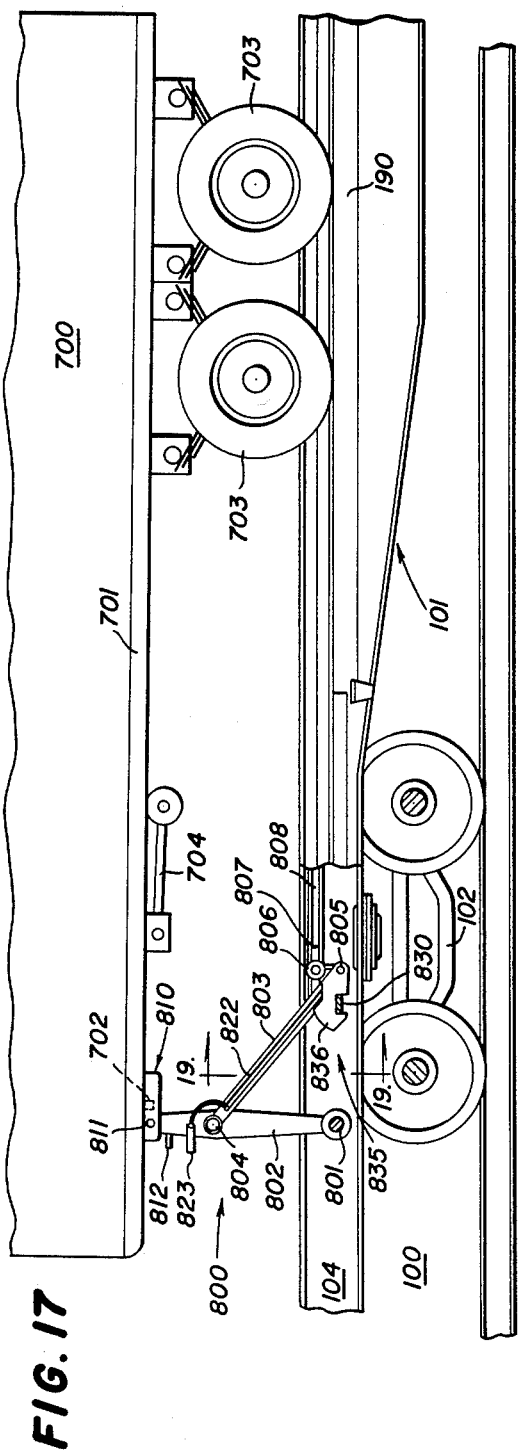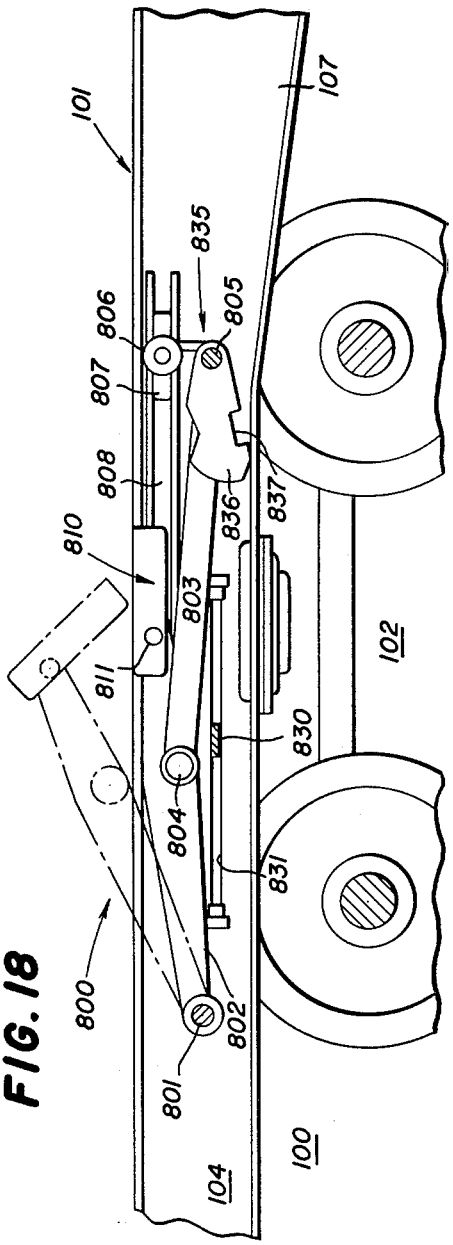

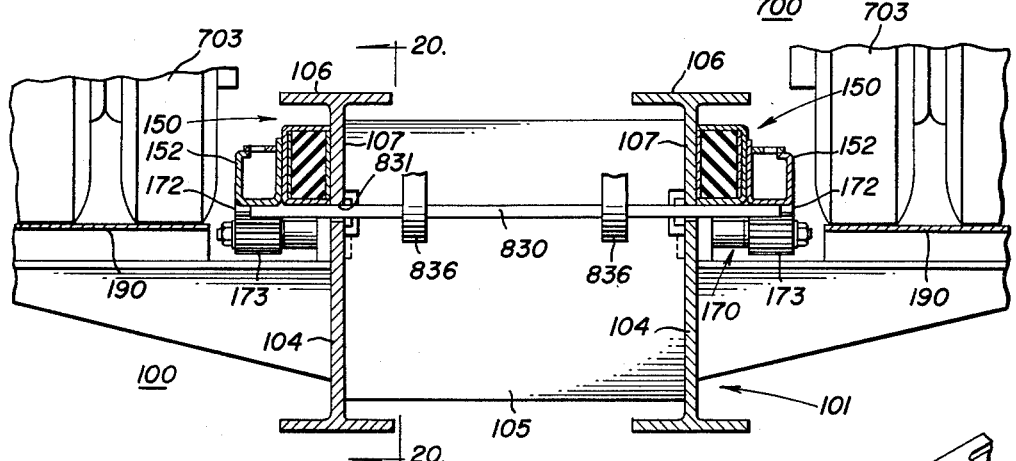
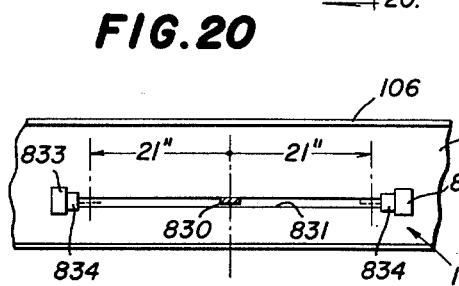
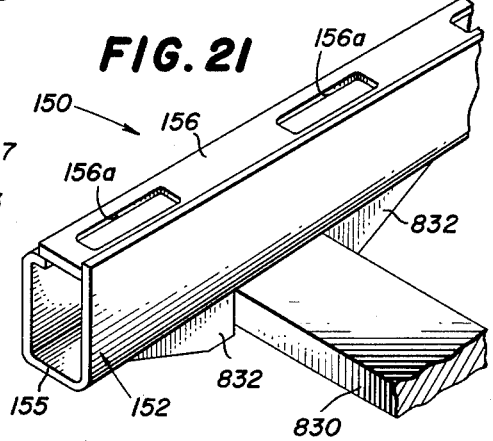
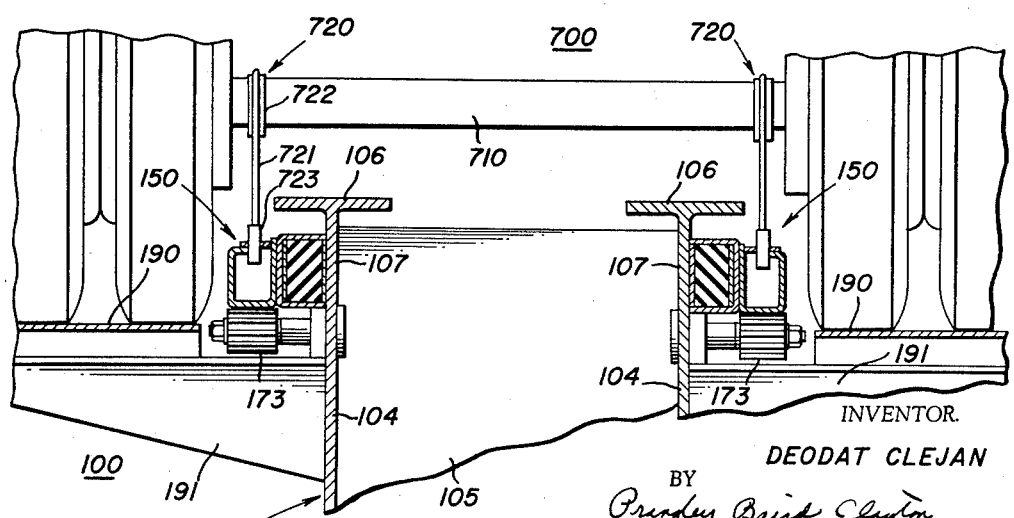

3,168,877
FREIGHT TRANSPORTATION SYSTEMS
Deodat Clejan, Chicago, Ill., assignor to General American Transportation Corporation, Chicago, Ill., a corporation of New York
Filed Nov. 29, 1962, Ser. No. 240,795
10 Claims. (Cl. 105—368)

The present invention relates to freight transportation systems, and more particularly to such systems of the road-and-railway type, wherein a freight container is provided that is adapted to be connected to road running gear to produce a composite road semi-trailer and that is adapted to be connected to railway running gear to produce a composite railway car. Specifically, in the system, the freight container may be selectively mounted jointly on a road tractor and on a road bogie for road use, and the freight container may be selectively mounted on a railway car of skeleton-like structure for railway use. Moreover, the road bogie may be selectively connected and disconnected with respect to the rear end of the freight container, and the railway car is adapted to carry the freight container, either with the associated road bogie connected thereto or disconnected therefrom, at the convenience of the shipper. Thus, the freight container may be carried as a road semi-trailer by the railway car or the freight container may be carried as a simple freight box by the railway car; and, of course, the railway car may carry a conventional road semi-trailer that is provided with fixed road running gear at the rear end thereof and may carry a simple freight box that is not especially adapted to cooperate with a road bogie.

It is a general object of the invention to provide a freight transportation system comprising a railway car of skeleton-like construction and a freight container; wherein the railway car comprises longitudinally spaced-apart running gears having rail wheels, an elongated longitudinally extending narrow beam bridging the running gears and lying between the planes of the inner sides of the rail wheels of the running gears, the top of the beam defining an elongated substantially horizontal platform, and a pair of elongated longitudinally extending members respectively resiliently mounted on the opposite outer sides of the beam for independent limited and cushioned longitudinal movements with respect thereto, the members being respectively positioned adjacent to and below the opposite upper side edges of the platform and also lying between the planes of the inner sides of the rail wheels of the running gears; and wherein the freight container comprises an elongated base adapted to be demountably carried by the top of the platform, a first pair of laterally spaced-apart depending connector elements rigidly affixed to the bottom of the base adjacent to one end thereof, a second pair of laterally spaced-apart depending connector elements rigidly affixed to the bottom of the base adjacent to the other end thereof, the two pairs of connector elements being substantially symmetrically disposed laterally with respect to the longitudinal center line of the base, the lateral pacing of each of the pairs of connector elements being only somewhat greater than the width of the platform, whereby the individual connecter elements in each of the pairs respectively project downwardly adjacent to the opposite sides of the beam when the base occupies its mounted position on the top of the platform, thereby to prevent lateral displacement of the mounted base from the top of the platform, a first pair of latching mechanisms respectively carried by the first connector elements and selectively operative into respective latching and unlatching positions with respect to the opposite sides of the beam when the base occupies its mounted position on the top of the platform, a second pair of latching mechanisms respectively carried by the second connecter elements and selectively operative into respective latching and unlatching positions with respect to the opposite sides of said beam when said base occupies its mounted position on the top of the platform, thereby to prevent vertical displacement of the mounted base from the top of the platform when the latching mechanisms occupy their latching positions, and a pair of attachment elements respectively carried by the first connector elements and respectively projecting downwardly therefrom into respective attaching relation with the members when the base occupies its mounted position on the top of the platform, whereby the members accommodate limited and cushioned longitudinal movements of the attached container relative to the beam when the base occupies its mounted position on the top of the platform.

Another general object of the invention is to provide a railway car of improved construction and arrangement that is adapted to carry and to transport indiscriminately a first type freight container that is devoid of road wheels or a second type freight container that is provided with road wheels, wherein the railway car affords the carried freight container adequate protection against the transmission thereto of severe longitudinal shocks regardless of the type thereof.

Another object of the invention is to provide a railway car for transporting a freight carrier; wherein the railway car comprises an elongated longitudinally extending frame, structure carried by the frame and defining on the top thereof an elongated longitudinally extending platform arranged in a substantially horizontal plane and adapted to support a freight carrier mounted thereon for longitudinal movements with respect to the frame, an elongated longitudinally extending rail mounted on the frame for longitudinal movements with respect thereto, and a shock-absorber connected between the frame and the rail, the rail being selectively connectible to a freight carrier mounted on the platform for longitudinal movements with respect to the frame, whereby the shock-absorber is adapted to afford a freight carrier mounted on the platform and connected to the rail protection against the transmission thereto of severe longitudinal shocks from the frame, and wherein the shock-absorber is so contructed and arranged that it accommodates long-travel, up to as much as twenty inches, of the rail in either longitudinal direction with respect to a normal position thereof.

Another object of the invention is to provide in a railway car of the character described, an improved shock-absorber that comprises a first anchor element rigidly secured to the frame, a second anchor element rigidly secured to the rail, and at least two resilient blocks and at least one link connected in series relation between the first and second anchor elements, each of the blocks being formed of elastomeric material and provided with opposed faces respectively securely affixed to two different ones of the elements, whereby longitudinal movement of the anchor elements in either direction relative to each other subjects each of the blocks to shear stresses between the opposed faces thereof.

Another object of the invention is to provide a railway car of the character described, and further comprising facility responsive to longitudinal movement in either direction from its normal position of the rail with respect to the frame for applying a frictional drag on the rail that is progressively increased in accordance with increased amounts of longitudinal movement in either direction from its normal position of the rail with respect to the frame, thereby progressively to increase the damping of the movement of the rail out of its normal position.

Another object of the invention is to provide a railway car of the character described, and further comprising a friction device carried by the frame and cooperating with the rail, wherein the friction device is selectively adjustable to preset a desired frictional drag on the rail.

Another object of the invention is to provide a railway car of the character described, and further comprising a plurality of longitudinally spaced-apart bearing devices carried by the frame and arranged below and in engagement with the rail for supporting the same in its longitudinal movements with respect to the frame.

Another object of the invention is to provide a railway car of the character described, and further comprising a plurality of longitudinally spaced-apart devices carried by the frame and cooperating with the rail, wherein each of the devices performs a combination of bearing and frictional drag functions with respect to the rail, thereby selectively to control the longitudinal movements from its normal position of the rail with respect to the frame.

Another object of the invention is to provide a railway car of the character described, wherein the rail is hollow and the shock-absorber is housed totally within the rail in order to protect the same against the deleterious effects of the elements of weather.

Another object of the invention is to provide a railway car of the character described, wherein the rail is hollow and a plurality of the shock-absorbers are housed in the rail and arranged in longitudinally spaced-apart relation with each other for the purpose of controlling the longitudinal movements of the rail with respect to the frame.

A further object of the invention is to provide a railway car for transporting a freight container, wherein the railway car comprises an elongated longitudinally extending frame, structure carried by the frame and defining on the top thereof an elongated longitudinally extending central platform arranged in a substantially horizontal plane, the central platform being adapted to support a freight container carried by the frame, a pair of elongated longitudinally extending members respectively resiliently mounted on the frame for independent limited and cushioned longitudinal movements with respect thereto, the members being disposed in substantially parallel laterally spaced-apart relation and respectively positioned adjacent to and below the opposite outer sides of the central platform, and a pair of attachment elements respectively carried by the members for securing in place a freight container mounted for longitudinal movements on the central platform, whereby the members afford the mounted freight container protection against the transmission thereto of severe longitudinal shocks from the frame, and wherein each of the members mentioned is of the improved rail-like construction previously described.

A further object of the invention is to provide a railway car for transporting a road semi-trailer, wherein the railway car comprises an elongated longitudinally extending frame, structure carried by the frame and defining on the top sides thereof a pair of elongated longitudinally extending and laterally spaced-apart side platforms arranged in a substantially horizontal plane, the side platforms being adapted respectively to support the road wheels respectively provided on the opposite sides of a road semi-trailer carried by the frame, a pair of elongated longitudinally extending members respectively resiliently mounted on the frame for independent limited and cushioned longitudinal movements with respect thereto, the members being disposed in substantially parallel laterally spaced-apart relation and respectively positioned adjacent to and above the opposite inner sides of the side platforms, and a pair of attachment elements respectively carried by the members for securing in place a road semi-trailer mounted for longitudinal movements on the side platforms, whereby the members afford the mounted road semi-trailer protection against the transmission thereto of severe longitudinal shocks from the frame, and wherein each of the members mentioned is of the improved rail-like construction previously described.

A further object of the invention is to provide a railway car for transporting road semi-trailers and of the character previously described, wherein the pair of elongated longitudinally extending members respectively resiliently mounted on the frame and respectively positioned adjacent to and above the opposite inner sides of the side platforms are respectively provided with smooth outer rubbing surfaces respectively presented to the adjacent inner sides of the road wheels respectively provided on the opposite sides of a road semi-trailer carried by the side platforms so as to prevent scuffing damage to the road wheels and to exert outwardly directed thrusts upon the road wheels incident to rubbing engagement therebetween, with the consequent limited and cushioned longitudinal movement of the engaged one of the members with respect to the frame, whereby the members constitute rub rails effecting inside guiding of a road semi-trailer carried by the side platforms incident to longitudinal movement of the carried road semi-trailer with respect to the frame.

A further object of the invention is to provide a railway car for transporting indiscriminately a freight container or a road semi-trailer and of the character previously described, wherein the elongated longitudinally extending frame of the railway car carries both first structure defining on the top thereof an elongated longitudinally extending central platform arranged in a substantially horizontal upper plane that is adapted to support a freight container carried by the frame and second structure defining on the top sides thereof a pair of elongated longitudinally extending and laterally spaced-apart side platforms arranged in a substantially horizontal lower plane that is adapted to support the road wheel respectively carried on the opposite sides of a road semi-trailer carried by the platform, and wherein the previously mentioned pair of elongated longitudinally extending members respectively resiliently mounted on the frame in substantially parallel laterally spaced-apart relation are respectively positioned adjacent to and below the opposite outer sides of the central platform and are respectively positioned adjacent to and above the opposite inner sides of the side platforms, whereby the pair of members mentioned are adapted to secure in place and to afford shock protection to either a freight container mounted on the central platform for longitudinal movements with respect to the frame or a road semi-trailer mounted on the side platforms for longitudinal movements with respect to the frame.

A still further object of the invention is to provide a railway car that is adapted to transport indiscriminately freight carriers or road semi-trailers, wherein the frame of the railway car is further provided with a stand mounted thereon intermediate the side platforms and selectively movable between a storage position and an erected position, the stand in its storage position being disposed closely adjacent to the top of the frame and between the side platforms and in its erected position being disposed well above the top of the frame and from between the side platforms, the stand being biased into its storage position, latching mechanism having a set position connecting the stand in its erected position to the previously mentioned members and a trip position disconnecting the stand from the members, facility responsive to movement of the stand into its erected position for actuating the latching mechanism into its set position, the stand in its erected position being biased by the connected members into a normal location and being movable fore-and-aft with respect thereto and longitudinally of the frame against the bias of the connected members, facility for actuating the latching mechanism into its trip position, whereby the stand is moved from its erected position back into its storage position in response to actuation of the latching mechanism into its trip position, a head carried by the upper end of the stand and adapted to be disposed in the erected position of the stand below and in supporting relation with the front end of a road semi-trailer mounted for longitudinal movements on top of the frame, and locking mechanism carried by the head and adapted to cooperate with the kingpin carried by the supported front end of a road semi-trailer mounted on top of the frame, the locking mechanism being selectively operative into a locked position connecting and holding a cooperating kingpin and into an unlocked position disconnecting and releasing a cooperating kingpin, the head and a connected road semi-trailer mounted on the top of the frame being movable as a unit longitudinally thereof effecting corresponding movements of the stand in its erected position against the bias of the connected members and fore-and-aft with respect to its normal location and longitudinally of the frame, whereby the members connected to the stand in its erected position limit and cushion and control the movements of the mounted road semi-trailer longitudinally of the frame.

Further features of the invention pertain to the particular arrangement of the elements of the freight transportation system and of the elements of the railway car, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a fractured side elevational view of a freight transportation system embodying the present invention and illustrating one end of a railway car adjacent to a tractor connected to a freight container supported at the front end thereof on the tractor fifth-wheel mechanism and at the rear end thereof on a road bogie;

FIG. 2 is a side elevational view of a freight transportation system embodying the present invention and including a railway car mounting two freight containers thereon;

FIG. 3 is an enlarged fragmentary side elevational view of one end of the railway car of FIG. 2 and illustrating one freight container thereon;

FIG. 4 is a fragmentary plan view of the end of the railway car shown in FIG. 3, the outline of a mounted freight carrier being shown in dashed lines;

FIG. 5 is an enlarged fragmentary and elevational view of the freight container;

FIG. 6 is an enlarged fragmentary side elevational view of the rear portion of the freight container and supporting road bogie of FIG. 1;

FIG. 7 is an enlarged fragmentary rear elevational view of the freight container and supporting road bogie of FIGS. 1 and 6;

FIG. 11 is a greatly enlarged side elevational view of the railway car, illustrating the mode of connecting the front end of the freight container to the rail, as shown in FIG. 3, and also showing one of the bearing devices supporting the rail;

FIG. 12 is a greatly enlarged side elevational view, similar to FIG. 11, of the railway car, illustrating the mode of connecting the rear end of the freight container to the center sill, as shown in FIG. 3, and also showing another of the bearing devices supporting the rail;

Figure 9:
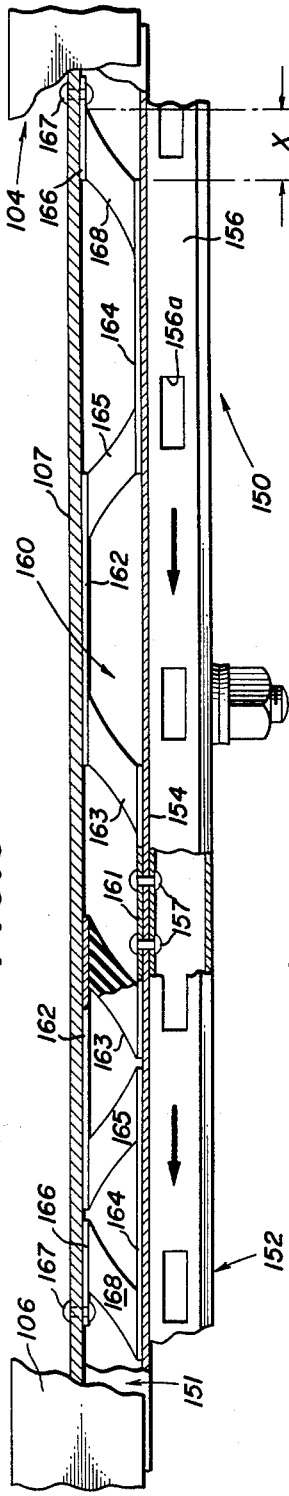
FIG. 9 is a view identical to that of FIG. 8 with the rail in its displaced position toward the left with respect to the center sill.

FIG. 17 is a fractured side elevational view of another form of the freight transportation system of the present invention, wherein a road semi-trailer is mounted on a railway car, the rear end of the semi-trailer being supported by its road wheels upon platforms carried by the railway car and the front end of the semi-trailer being supported by a fifth-wheel hitch engaging the kingpin thereof and connected to the shock-absorbing mechanism carried by the railway car;

FIG. 18 is an enlarged fragmentary view in vertical section illustrating the fifth-wheel hitch of FIG. 31 in the retracted position in solid lines and in an intermediate position in dashed lines;

FIG. 19 is an enlarged fragmentary vertical sectional view of the railway car, taken in the direction of the arrows along the line 19—19 in FIG. 17;

FIG. 20 is a reduced fragmentary vertical sectional view of the railway car, taken in the direction of the arrows along the line 20—20 in FIG. 19;

FIG. 21 is an enlarged fragmentary front perspective view of one of the rails slidably mounted upon the center sill of the railway car and connected to a cross bar forming a part of the hitch, as shown in FIGS. 17 to 20, inclusive; and FIG. 22 is an enlarged fragmentary vertical sectional view, similar to FIG. 19, of the railway car, illustrating structure for connecting the rear axle housing of a road semi-trailer mounted upon the railway car to the pair of side rails carried by the opposite sides of the center sill of the railway car.

Referring now to FIGS. 1 and 2 of the drawings, the freight transportation system there illustrated, and embodying the features of the present invention, essentially comprises a railway car 100, a freight container 200, a tractor 300 and a road bogie 400 adapted to support the freight container 200 for road transportation thereof.

The railway car 100 is best illustrated in FIGS. 1 to 4, inclusive, and 19 to 22, inclusive, and essentially comprises an elongated longitudinally extending center sill 101 of "fish belly" construction supported at the opposite ends thereof by a pair of trucks 102 of standard rail gauge that cooperate with an associated railway track 103, also of standard rail gauge. The center sill 101 essentially comprises a pair of longitudinally extending and laterally spaced-apart I-beams 104 that are suitably connected together at a plurality of longitudinally spaced-apart points by a corresponding plurality of cross braces 105. The top flanges 106 of the I-beams 104 constitute a pair of longitudinally extending and laterally spaced-apart rails provided on the top of the center sill 101 and constituting a trackway of given narrow gauge lying between the planes of the inner sides of the rail wheels of the trucks 102.

Figure 8:
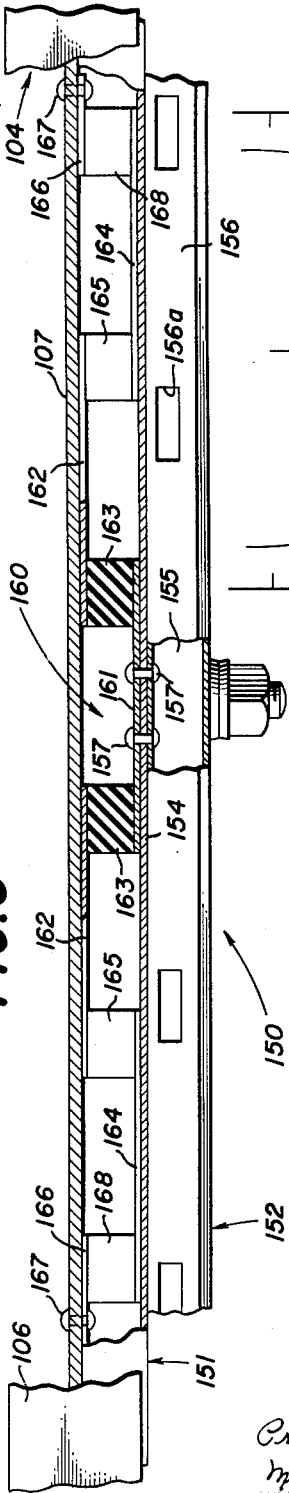
FIG. 8 is a greatly enlarged plan view, partly in section, of one of the two elongated rails that are respectively slidably mounted upon the opposite sides of the center sill of the railway car of FIGS. 2 to 4, inclusive, and the associated shock-absorber, the rail occupying its normal position.
Figure 13:
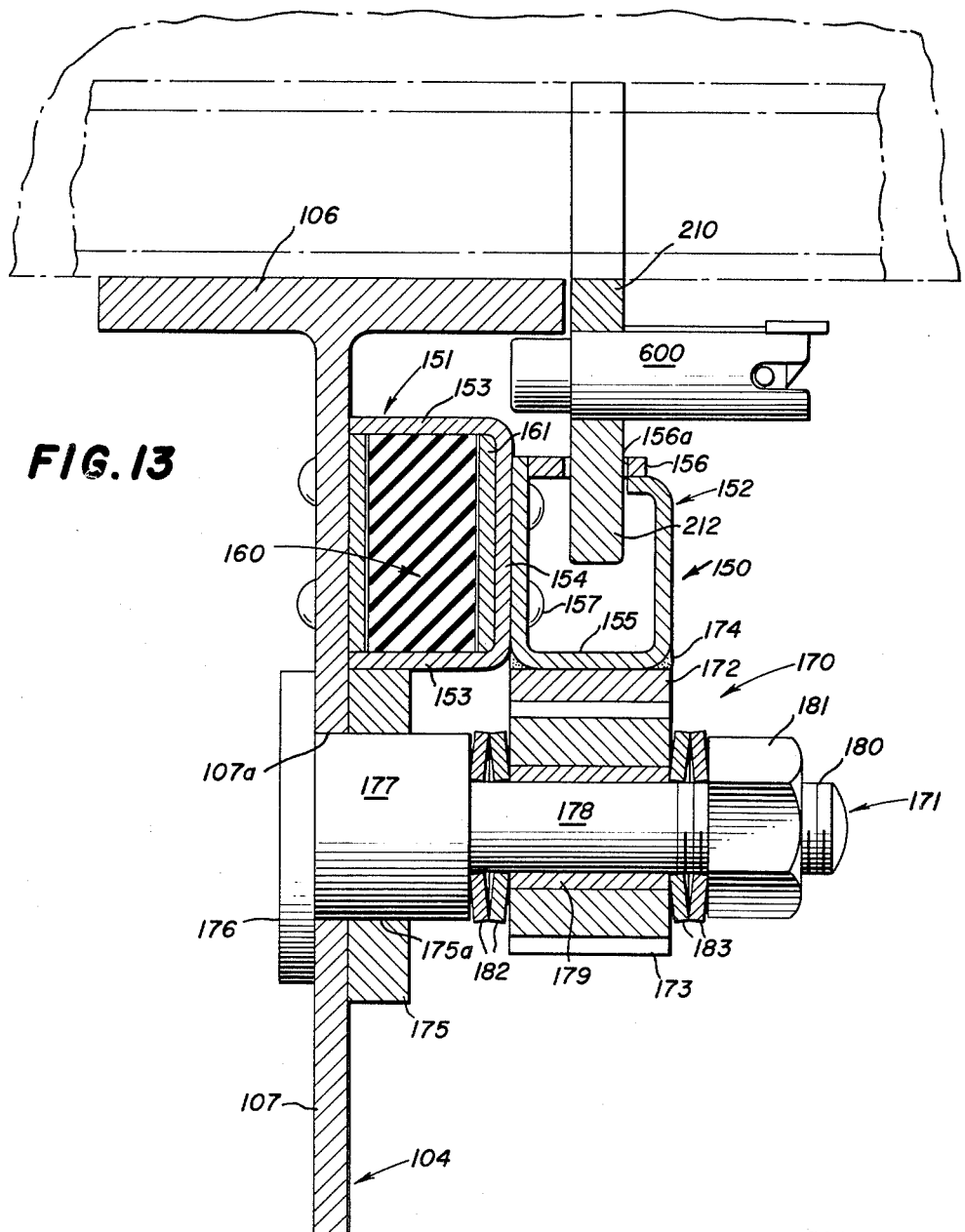
FIG. 13 is a very greatly enlarged vertical sectional view of the bearing device, as shown in FIG. 11, and also showing the locking device that is carried by one of the two front plates arranged at the front end of the freight container, this view being taken in the direction of the arrows along the line 13—13 in FIG. 11.

Two pairs of elongated and longitudinally extending rails 150 are slidably mounted on the opposite sides of the center sill 101 on the webs 107 of the I-beams, as shown in FIGS. 2, 3, 4, 8, 9, 11, 12, 13 and 19, the two rails 150 of each pair being arranged in longitudinal alignment with each other, and the two tandem related rails 150 extending substantially the entire length of the associated I-beam 104. As best shown in FIGS. 8, 9 and 13, each of the rails 150 is of composite construction including an inner hollow box-like structure 151 and an outer hollow box-like structure 152 rigidly secured together. The inner structure 151 essentially comprises a channel section including a web 153 and a pair of flanges 154, the flanges 154 facing the web 107 of the I-beam 104 and slidably engaging the same. The outer structure 152 includes a substantially U-shaped structural element 155, the top of which is covered by a top plate 156 rigidly secured thereto, as by welding. One leg of the element 155 may be rigidly secured to the web 154 of the channel 151 by rivets 157; and the top plate 156 has a plurality of longitudinally spaced-apart substantially rectangular attachment slots 156a formed therein that are employed in securing freight items to the rail 150, as explained more fully hereinafter. As best shown in FIG. 13, the rail 150 is mounted adjacent to the top of the web 107 and immediately below the outer flange 106, the inner structure 151 being positioned entirely under the outer flange 106, and the outer structure 152 projecting laterally outwardly beyond the outer edge of the outer flange 106.

The rail 150 is operatively connected to the web 107 of the I-beam 104 by a plurality of shock-absorbers 160 housed within the inner structure 151, two of the shock-absorbers 160 being indicated at the opposite ends of the rail 150, as shown in FIG. 3. Each of the shock-absorbers 160, in fact, comprises two parallel connected shock-absorbing units, as best shown in FIGS. 8 and 9. Specifically, the shock absorber 160 comprises a centrally disposed anchor link 161 rigidly secured to the web 154 of the channel 151 and to the adjacent leg of the element 155 by rivets 157. A pair of links 162 are disposed adjacent to the web 107 of the I-beam 104 and are respectively connected at the inner ends thereof to the outer ends of the anchor link 161 by two blocks 163; a pair of links 164 are disposed adjacent to the web 154 and are respectively connected at the inner ends thereof to the outer ends of the links 162 by two blocks 165; and two anchor links 166 are disposed adjacent to the web 107 and are rigidly connected at the outer ends thereof to the web 107 by rivets 167, and the inner ends of the anchor links 166 are respectively connected at the inner ends thereof to the outer ends of the links 164 by two blocks 168. Each of the blocks 163, 165 and 168 is formed of elastomeric material, such as live rubber; and the opposed inner and outer faces of each of the blocks 163, etc., is securely affixed, as by bonding, to the respectively cooperating pair of links 161-162, etc. Thus, the two units of the shock-absorber 160 are arranged in parallel relation between the two webs 107 and 154, and each of the units includes three of the blocks (163, 165 and 168) and two of the connecting links (162 and 164) and the two anchor links 161 and 166 arranged in series relation between the two webs 107 and 154. This mounting arrangement accommodates limited long travel of the rail 150 with respect to the I-beam 104, within the approximate range 10 to 20 inches in either direction of the rail 150 from its normal position, as shown in FIG. 8, and with respect to the I-beam 104. In fact, it is preferable that each of the blocks 163, etc., be capable of a movement of about 7 inches, whereby the travel mentioned of the rail 150 is then 21 inches in either direction from its normal position.

Considering now the mode of operation of the shock-absorber 160, movement of the rail 150 longitudinally in either direction from its normal position, as shown in FIG. 8, with respect to the I-beam 104 compresses one of the units and expands the other of the units. For example, movement of the rail 150 to the left, compresses the left-hand unit and expands the right-hand unit, as shown in FIG. 9. In the left-hand unit, the anchor link 161 is moved toward the link 162 and the link 162 is moved toward the link 164 and the link 164 is moved toward the anchor link 166; whereby the blocks 163, 165 and 168 assume the strained positions illustrated, with the result that each of the blocks mentioned is subjected to shear stresses between the opposed faces thereof between the two adjacent connected ones of the links. In the right-hand unit, the anchor link 161 is moved away from the link 162 and the link 162 is moved away from the link 164 and the link 164 is moved away from the anchor link 166; whereby the blocks 163, 165 and 168 assume the strained positions illustrated, with the result that each of the blocks mentioned is subjected to shear stresses between the opposed faces thereof between the two adjacent connected ones of the links. Thus, the blocks 163, 165 and 168 in the two units of the shock-absorber 160 resiliently oppose movements of the rail 150 out of its normal position of FIG. 8 and act to restore the rail 150 back into its normal position following movement thereof out of its normal position and independently of the direction of the longitudinal movement of the rail 150 out of its normal position, as shown in FIG. 8.

While each unit of the shock-absorber 160 has been illustrated as comprising three of the elastic blocks 163, 165 and 168, actually any suitable number of such blocks may be arranged between the two anchor links 161 and 166 utilizing an appropraite number of the connecting links 162, 164, etc. However, as a practical matter too much movement of the rail 150 becomes objectionable, as will be explained more fully hereinafter, whereby the present description proceeds on the basis that the maximum slide of the rail is 21 inches in either direction from the normal position, as shown in FIG. 8. In some special case, not here considered, a longer travel of the rail 150 may be desired; whereby the number of blocks arranged in series between the anchor links may then be increased to obtain the required travel. In passing it is mentioned that to increase the stiffness of the rail 150 in its movements, the number of shock-absorbers 160 may be increased, and the number of blocks 163 incorporated in each unit of each shock-absorber 160 may be decreased; and of course, reversal of the changes mentioned above will effect a decrease in the stiffness of the rail 150 in its movements in an obvious manner.

Figure 10:
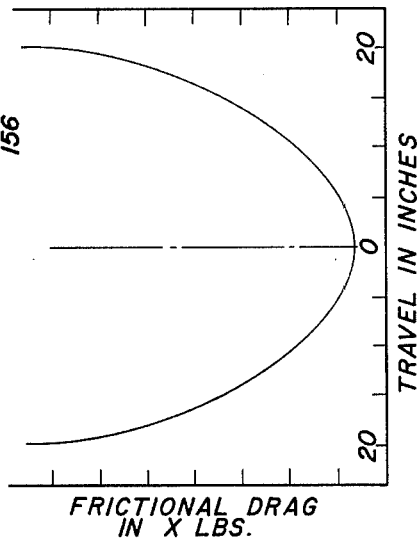
FIG. 10 is a graph illustrating a performance characteristic of the shock-absorber and indicating the increase in frictional drag that is exerted upon the rail in response to movements thereof in either direction out of its normal position and with respect to the center sill.

Further considering the mode of operation of the shock-absorber 160, as the rail 150 travels out of its normal position of FIG. 8, the blocks 163, etc., not only offer a somewhat increased opposition to further such movement, but they develop an increasing lateral force between the anchor links 161 and 166 that presses the rail 150 toward the I-beam 104; with the result that the inner edges of the flanges 153 of the channel 151 incorporated in the rail 150, as shown in FIG. 13, are forced into increasing frictional engagement with the web 107; whereby the frictional drag upon the movement of the rail 150 is increased. This increase in frictional drag that is exerted upon the rail 150 is response to travel thereof out of its normal position of FIG. 8 is illustrated in the graph of FIG. 10. It will be understood that this factor tends to prevent "closure" (a solid condition) of the shock-absorber 160 that is reached upon a travel of 21 inches therein, except under the most unusual condition involving the transmission of a longitudinal shock from the center sill 101 that is of such intensity as to correspond approximately to a 10 mile per hour collision of the railway car 100.

The rail 150 is supported in its longitudinal movements on the web 107 of the I-beam 104 by a plurality of bearing devices 170, two of the bearing devices 170 being indicated at the opposite ends of the rail 150, as shown in FIG. 3. Each of the bearing devices 170 essentially comprises, as best shown in FIGS. 11, 12 and 13, an arbor 171 carried by the web 107 of the I-beam 104, an elongated rack 172 carried by the rail 150, and a pinion 172 rotatably mounted upon the arbor 171 and engaging the rack 172. Specifically, the rack 172 is rigidly secured, as by welding, as shown at 174 in FIGS. 11 and 13, to the bottom of the U-shaped member 155 defining the outer box-like structure 152. An opening 107a is formed in the web 107; and a reinforcing plate 175 is rigidly secured to the outer surface of the web 107, as by welding, the plate 175 having an opening 175a therein disposed in alignment with the opening 107a. The inner end of the arbor 171 carries an enlarged head 176 that engages the inner surface of the web 107; and a cylindrical barrel 177 carried by the arbor 171 adjacent to the head 176 nicely fits into the aligned openings 107a and 175a. The arbor 171 also comprises a cylindrical barrel 178 of reduced diameter projecting outwardly from the barrel 177; and the inner portion of the pinion 173 carries a cylindrical bearing sleeve 179 that nicely fits onto the barrel 178, thereby to support the pinion 173 for rotation upon the barrel 178. The extreme outer end of the arbor 171 is threaded, as indicated at 180, and carries a nut 181. A pair of spring washers 182 are arranged on the inner end of the barrel 178 between the shoulder at the outer end of the barrel 177 and the adjacent inner side of the pinion 173; and a pair of spring washers 183 are arranged on the outer end of the barrel 178 between the nut 181 and the adjacent outer side of the pinion 173; which arrangement of the spring washers 182 and 183 constitutes a friction device for imposing a frictional drag upon rotation of the pinion 173 for a purpose explained below. The upper edge of the reinforcing plate 175 directly supports the lower flange 153 of the channel 151 incorporated in the rail 150 and accommodates sliding of the rail 150 with respect thereto.

Considering now the mode of operation of the bearing device 170, the rail 150 is free to slide in either direction from its normal position of FIG. 8 against the resilient cushioning action of the shock-absorber 160, as previously explained; whereby the moving rail 150 carries therewith the rack 172 engaging the pinion 173, so as to rotate the pinion 173 upon the arbor 171 rigidly affixed to the web 107 of the I-beam 104. The pinion 173 not only supports the rack 172, and consequently the outer structure 152 of the moving rail 150, but it also exerts a frictional drag through the rack 172 upon such movement of the rail 150. The amount of such frictional drag may be readily preset or adjusted by appropriate adjustment of the nut 181 on the thread 180, since the position of the nut 181 upon the thread 180, establishes the strain in the spring washers 182 and 183 and the resulting frictional drag they exert upon the pinion 173 in its rotation upon the barrel 178.

This arrangement of the bearing devices 170 is very advantageous as the same assists the shock-absorbers 160 in damping out undesirable oscillation of the rail 150 with respect to the center sill 101; and moreover, the frictional drags that are imposed by the bearing devices 170 may be selectively adjusted in accordance with the character of the freight items that are carried by the railway car 100 and connected to the rails 150, as explained more fully hereinafter.

Referring now to FIG. 1 the road tractor 300 includes a chassis 301 supported by front and rear sets of road wheels 302 and having the usual control cab 303 on the front end thereof and a fifth-wheel mechanism 304 on the rear end thereof; which fifth-wheel mechanism 304 is selectively movable between a relatively low road traveling position and a relatively high transfer position in a conventional manner.

In FIGS. 1, 2 and 3, the freight container 200 is illustrated as comprising a rigid base 201 carrying at the front central portion thereof a low depending kingpin, indicated at 202 in FIG. 1, that is adapted to cooperate with the fifth-wheel mechanism 304 carried by the rear end of the chassis 301 of the road tractor 300, when the freight container 200 is adapted for road travel. Also, at this time, the rear end of the container 200 is supported by the road bogie 400 and the front end thereof is supported by the fifth-wheel mechanism 304. The base 201 is of substantially rectangular form and carries cooperating upstanding wall structure 203 to define a substantially box-like body 204 enclosing the usual lading compartment, not shown. In order to accommodate the connection of the road bogie 400 to the base 201, the same carries at the opposite sides thereof a pair of longitudinally extending outwardly facing channels 205, as best shown in FIGS. 6 and 7.

Referring to FIGS. 1, 6 and 7, the road bogie 400 essentially comprises a chassis 401 supported by pairs of front and rear road wheels 402, the chassis 401 supporting a frame 403 that is movable between a relatively low road traveling position and a relatively high transfer position, in a conventional manner. The frame 403 may be selectively moved between its positions mentioned by pneumatic mechanism 404 mounted between the chassis 401 and the frame 403 from a control panel 405, as indicated in FIG. 7, and independently of the road tractor 300. Carried on the frame 403 adjacent to the opposite sides thereof are a pair of latch members 406 that may selectively move laterally into latched and unlatched positions with respect to the channels 205 carried by the base 201, when the rear end of the base 201 is supported by the road bogie 400. The road operation of the container 200, when mounted upon the road bogie 400 and the fifth-wheel mechanism 304 provided on the rear end of he chassis 301 of the road tractor 300 is entirely conventional as a road semi-trailer.

Referring now to FIGS. 1 to 5, inclusive, 11 and 12, the base 201 of the freight container 200 carries a pair of front depending plates 210 adjacent to the front end thereof and arranged in laterally spaced-apart relation and a pair of rear depending plates 220 adjacent to the rear end thereof and arranged in laterally spaced-apart relation; which pairs of plates 210 and 220 are symmetrically arranged with respect to the longitudinal center line of the base 201, as illustrated in FIG. 5. More particularly the individual plates in the two pairs 210 and 220 are laterally spaced-apart a distance that is only somewhat in excess of the width of the center sill 101 between the outer edges of the top flanges 106; whereby the two pairs of plates 210 and 220 are spaced only somewhat outwardly with respect to the adjacent edges of the flanges 106 when the freight container 200 is mounted upon the top of the substantially horizontal platform defined by the flanges 106 upon the top of the center sill 101, as shown in FIG. 5; whereby the depending plates 210 and 220 prevent lateral displacement of the mounted container 200 from the railway car 100 in the railway transportation of the container 200.

Referring to FIG. 11, the top edge of the front plate 210 has three longitudinally spaced-apart notches 211 therein that respectively receive three of the laterally extending and longitudinally spaced-apart channels 206 that are incorporated in the base 201 of the container 200; and the rear plate 220 is rigidly secured in place, as by welding. Also, each of the plates 210 and 220 carries a locking device 600, described more fully hereinafter, that is selectively operative into locking and unlocking positions with respect to the adjacent top flange 106, as illustrated in FIG. 13. Thus, when the four locking devices 600 respectively carried by the two plates 210 and the two plates 220 occupy their locked positions, the container 200 in its mounted position upon the top of the center sill 101 is securely locked against vertical displacement from the railway car 100.

Referring now to FIGS. 11 and 13, each of the front plates 210 further comprises a pair of longitudinally spaced-apart depending lugs 212 that project downwardly into two of the longitudinally spaced-apart slots 156 formed in the top plate 156 of the outer hollow structure 152 of the adjacent rail 150; whereby the container 200 in its mounted position upon the top of the center sill 101 is secured to the two rails 150 disposed on the opposite sides of the center sill 101. Accordingly, the rails 150 connected to the mounted container 200 protect the same against the transmission thereto of severe longitudinal shocks from the center sill 101.

Referring now to FIGS. 13 to 16, inclusive, the four locking devices 600 are identical; and the locking device 600 carried by the front plate 210 essentially comprises a substantially cylindrical barrel 611 rigidly secured at the inner end thereof in a hole provided in the associated plate 210, the barrel 611 being disposed in a substantially horizontal position, when the container 200 occupies its mounted position upon the center sill 101. A plunger 612 is slidably mounted in the barrel 611 and includes a section 613 of reduced diameter that is housed in the barrel 611. A helical coil spring 614 surrounds the section 613 of the plunger 612 and acts at one end thereof against an abutment 615 carried by an outer portion of the barrel 611 and acts at the other end thereof against a shoulder 616 carried by an inner portion of the plunger 612. The spring 614 is of the compression type, whereby it biases the plunger 612 inwardly with respect to the barrel 611, so as to project the extreme inner or locking end 617 of the plunger 612 into a locked position with respect to the adjacent laterally outwardly directed section of the top flange 106 of the associated I-beam 104, when the container 200 occupies its mounted position upon the center sill 101, as illustrated in FIG. 5. The extreme outer end of the barrel 611 is provided with a cross-slot 618; and the extreme outer end of the plunger 612 is provided with a rod-like handle 619 that cooperates with the slot 618.

Figure 14:
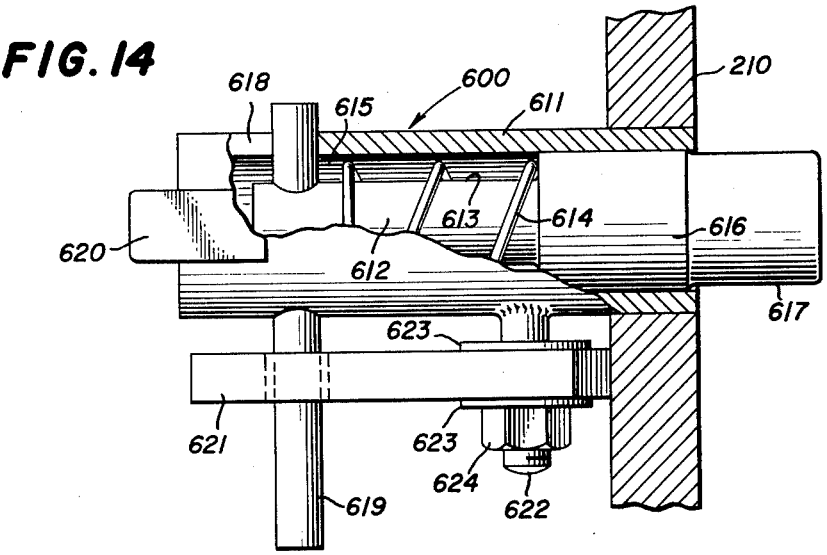
FIG. 14 is a very greatly enlarged plan view, partly broken away, of the locking device, this view being taken in the direction of the arrows along the line 14—14 in FIG. 11.
Figure 15:
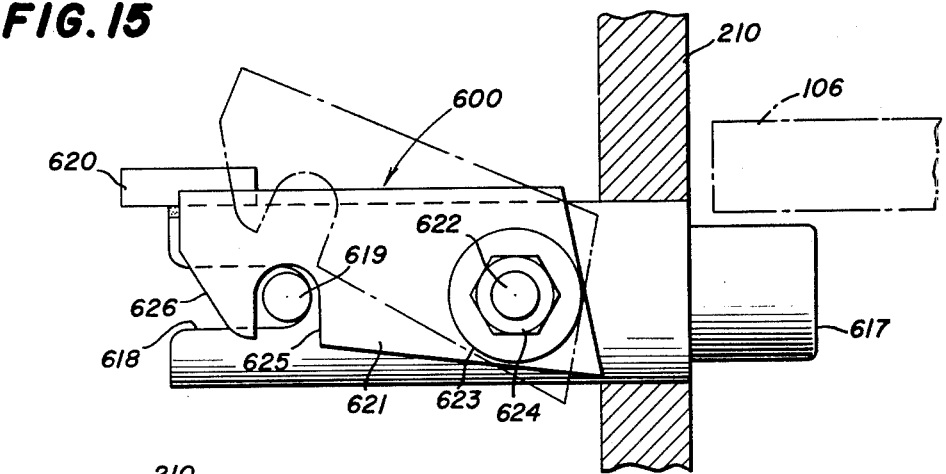
FIG. 15 is a very greatly enlarged side elevational view of the locking device, as shown in FIG. 14.
Figure 16:
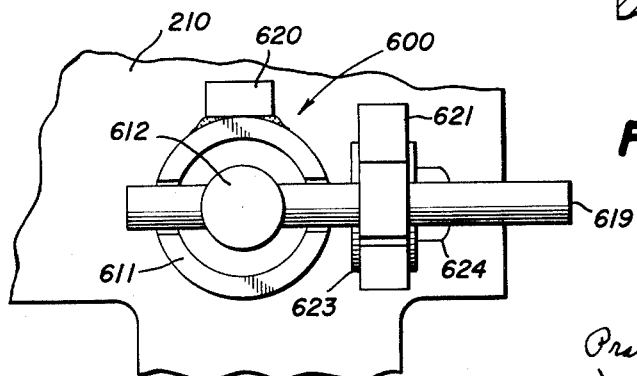
FIG. 16 is a very greatly enlarged end elevational view of the locking device, as shown in FIGS. 14 and 15.

The plunger 612 may be moved outwardly within the barrel 211 by pulling outwardly upon the handle 619; whereby the locking end 617 of the plunger is retracted into its unlocked position with respect to the laterally outwardly directed section of the adjacent top flange 106; whereupon the handle 619 is positioned at the extreme outer end of the barrel 611 and clear of the cross-slot 618 therein; and whereby the spring 614 is further compressed between the abutments 615 and 616. At this time, the handle 619 may be restrained in its outward position, so as to retain the locking end 617 of the plunger 612 in unlocked position, merely by rotating the same out of alignment with the cross slot 618. Also, the top of the barrel 611 carries an outwardly projecting stop 620 that arrests rotation of the handle 619, so as to prevent override thereof and undesired realignment thereof with the cross-slot 618. In order to return the locking end 617 of the plunger 612 back into its locked position, the handle 619 is merely rotated back into alignment with the cross-slot 618 and released; whereby the spring 614 returns the plunger 612 inwardly projecting the locking end 617 thereof into its locked position and causing the handle 619 to ride into the cross-slot 618, as shown in FIG. 14.

Also, the locking device 600 comprises a gravity-actuated latch 621 that is pivotally mounted upon a stud 622 carried by the side of the barrel 611 adjacent to the plate 210; which latch 621 is secured in place between two washers 623 disposed on opposite sides thereof on the stud 622, the outer end of the stud 622 being threaded and carrying a retaining nut 624. More particularly, the front portion of the latch 221 has a downwardly opening or keeper slot 625 formed therein that cooperates with the handle 619; and also, the front end of the latch 621 is provided with a downwardly and inwardly sloping surface 626 thereon that also cooperates with the handle 619. Specifically, when the handle 619 in its outer position is rotated into alignment with the cross-slot 618 and then released, the same is moved inwardly with the plunger 612 by the spring 614, as previously noted. As the handle 619 moves inwardly in the cross-slot 618, it engages the surface 626 provided upon the front end of the latch 621, so as first to pivot the latch 621 upwardly about the stud 622 and then to move under and in alignment with the keeper slot 625. The latch 621 is returned downwardly by gravity, whereby the keeper slot 625 therein rides over the handle 619, as shown in FIG. 14, when the locking end 617 of the plunger 612 is in its locked position. Of course it is necessary manually to raise the latch 621 against the bias of gravity in order to move the handle 619 outwardly to actuate the locking end 617 of the plunger 612 into its unlocked position. Accordingly, the arrangement of the latch 621 positively prevents unintentional operation of the locking end 617 of the plunger 612 into its unlocked position.

The freight container 200 may be transferred from road operation into railway operation, or conversely, using any suitable apparatus, such for example, as an overhead gantry crane, not shown. Ordinarily, the container 200 is carried on the railway car 100, without its road bogie 400, as illustrated in FIGS. 2 and 3. However, the container 200 may be carried on the railway car 100, with its road bogie 400 attached thereto and consequently as a regular or normal road semi-trailer as explained below.

Referring now to FIGS. 17 to 22, inclusive, the railway car 100 further comprises a pair of elongated longitudinally extending road platforms 190 carried on the opposite sides thereof and extending from end to end of the center sill 101; which road platforms 190 are arranged in a substantially horizontal lower plane positioned below the upper plane of the top flanges 106, as clearly shown in FIGS. 19 and 22. Each of the road platforms 190 is carried by a plurality of laterally projecting side arms 191 arranged in longitudinally spaced-apart relation and rigidly secured, as by welding, at the inner ends thereof to the adjacent I-beam 104. Each of the road platforms is arranged laterally outwardly from and below the adjacent one of the rails 150; whereby each rail 150 is arranged below the adjacent top flange 106 and above the adjacent road platform 190; and the outer section 152 of each rail 150 is disposed laterally outwardly of the outer side of the adjacent top flange 106 and laterally inwardly of the inner side of the adjacent road platform 190. Of course the road platforms 190 are adapted to engage the road wheels disposed on the opposite sides of a road tractor, road semi-trailer, or other road vehicle mounted on the railway car 100.

Referring to FIG. 17 the railway car 100 there illustrated supports an ordinary or conventional road semi-trailer 700 that comprises a base 701 carrying a kingpin 702 at the front end thereof and carrying road wheels 703 at the rear end thereof, as well as a conventional front end landing gear 704 disposed rearwardly of the kingpin 702. Further, the railway car 100 comprises two hitches 800, only one of which is shown. The hitch 800 shown has an erected position, as illustrated in FIG. 17, wherein the hitch 800 supports the front end of the road semi-trailer 700 and locks the kingpin thereof, and wherein the rear end of the road semi-trailer 700 is supported by its road wheels 703 in engagement with the road platforms 190.

The road semi-trailer 700 may be end-loaded upon the railway car 100, whereby the road semi-trailer 700 and its cooperating road tractor 300 are backed onto the adjacent end of the railway car 100, when the hitch 800 occupies its storage position disposed within a storage well provided in the center sill 101, as illustrated in FIG. 18, and as more fully described below. The front end of the road semi-trailer 700 is supported by the fifth-wheel mechanism 304 of the road tractor 300 in the initial phase of the loading operation and the road tractor 300 and the road semi-trailer 700 are backed along the string of coupled railway cars until the road semi-trailer 700 is properly positioned upon the railway car 100, as illustrated in FIG. 17. During backing of the road semi-trailer 700 along the railway car 100, should there be a misalignment between the center line of the road semi-trailer and the center line of the railway car 100, one of the road wheels 702 would rub against the adjacent one of the rails 150, causing it to yield and move with the engaging road wheel 702 due to the previously described action of the shock-absorbers 160 connected between the engaged rail 150 and the adjacent I-beam 104. Not only does this action of the rail 150 prevent scuffing damage to the rubber tires carried by the road wheels 703, but it also causes the engaged rail 150 to exert an outwardly directed thrust upon the road wheel 703 tending to straighten or realign the road semi-trailer 700 upon the railway car 100, thereby to prevent "jack-knifing" between the road tractor 300 and the road semi-trailer 700; which arrangement is very advantageous and greatly facilitates the loading operation. As best shown in FIG. 19, not only is the outer surface of the outer structure 152 of the rail smooth and rounded to obtain the above-described anti-scuffing feature, but the bearing members 170 are positioned under the rail 150 and generally below the adjacent road platform, so that it is impossible for the road wheel 703 to engage the bearing member 170 in the backing movement of the road semi-trailer.

In the construction of the railway car 100, as illustrated in FIG. 19, the width of the upper platform defined by the top flanges 106 plus the out-projections of the rails 150 from the webs 107 of the I-beams 104 is less than the normal width between the inner sides of the oppositely disposed road wheels 703, so that the road wheels 703 do not engage the rails 150, except in the case of misalignment of the road semi-trailer 700, as described above. Moreover, the out-projection of the rail 150 absolutely prevents the possibility of engagement between the road wheel 703 and the adjacent outer edge of the top flange 106. Finally, it is mentioned that the vertical distance between the lower plane of the road platforms 190 and the upper plane of the flanges 106 is substantially less than the normal road clearance of a road vehicle, so that there is no drag of the underframe of a road vehicle in longitudinal movement thereof in its supported position upon the railway car 100.

In the railway car 100, the two hitches 800 are arranged in longitudinally spaced-apart relation; one of the hitches, not shown, is mounted upon the center sill 101 adjacent to the intermediate portion thereof; and the other hitch 800, shown, is mounted upon the center sill 101 adjacent adjacent to one end thereof, as illustrated in FIGS. 17 and 18. More particularly, this semi-trailer hitch 800 that is incorporated in the railway car 100, as shown in FIGS. 17 and 18, is preferably of the fundamental construction and arrangement of that disclosed in the copending application of Deodat Clejan, Serial No. 237,201, filed November 13, 1962; whereby the hitch 800 essentially comprises a laterally extending trunnion 801 supported on the opposite ends thereof in the webs of the laterally spaced-apart I-beams 104 of the center sill 101, a standard 802 and a strut 803; which hitch 800 is operative between a storage position, as shown in FIG. 18, wherein it is disposed within the hollow center sill 101 and below the top thereof, and an erected position, as shown in FIG. 17, wherein it is disposed out of the hollow center sill 101 and well above the top thereof. More specifically, the trunnion 801 is pivotally mounted about a fixed axis upon the center sill 101 and has fixedly attached thereto the lower end of the standard 802 so that the standard 802 pivots about the axis of the trunnion 801; and one end of the strut 803 is pivotally connected to the standard 802 intermediate the ends thereof by a pivot pin 804, and the other end of the strut 803 is mounted upon a shaft 805 so that the strut 803 pivots about the axis of the shaft 805. The shaft 805 is shiftable longitudinally along the center sill 101 and is rigidly connected to a tubular member 806 extending laterally between the I-beams 104 and having the ends thereof supported respectively by a pair of slides 807 disposed respectively in a pair of associated trackways 808 mounted on the inner facing sides of the webs 107 of the I-beams 104, whereby the lower end of the strut 803 is mounted for longitudinal sliding movement within the center sill 101 and guided thereon by means of the trackways 808 and the associated slides 807, the strut 803 pivoting about the axis of the shaft 805 when the slides 807 move along the trackways 808.

The upper end of the standard 802 carries a fifth-wheel mechanism 810 of the construction and arrangement of that disclosed in U.S. Patent No. 3,050,320, granted August 21, 1962 to Deodat Clejan; which fifth-wheel mechanism 810 is pivotally mounted on the upper end of the standard 802, as shown at 811, and carries mechanism for releasably engaging the kingpin 702 on the road semitrailer 700, the fifth-wheel mechanism 810 also including the release actuator 812 mounted on the standard 802. When the actuator 812 is moved to the right, as viewed in FIG. 17, it serves to release the locking jaws gripping the kingpin 702 and locking it to the fifth-wheel mechanism 810, the release actuator 812 being automatically operable upon contact with a first abutment on the associated road tractor 300 so as automatically to cause release of the kingpin 702 when the road tractor 300 is moved into position to receive the front end of the road semi-trailer 700 from the fifth-wheel mechanism 810 in a flying transfer of the kingpin 702 from the fifth-wheel mechanism 810 to the fifth-wheel mechanism 304 of the road tractor 300, as will be explained more fully hereinafter.

When the hitch 800 is in the erected position, illustrated in FIG. 17, it is desirable that the lower end of the strut 803 connected to the shaft 805 be also connected to the rails 150 and to this end there has been provided a cross bar 830 which is mounted for sliding horizontal movement longitudinally of the center sill 101; and more particularly, the cross bar 830 extends through elongated slots 831 formed in each of the I-beams 104. The outermost ends of the cross bar 830 extend through and outwardly beyond the associated I-beams 104 and underneath the associated rails 150 and terminating inwardly with respect to the outer sides thereof. As illustrated in FIG. 21, interconnection is made between each rail 150 and the adjacent end of the cross bar 830 by means of opposed pairs of abutments 832 fixedly secured to the bottom of the element 155 of the outer section 152 of the rail 150, the abutments 832 on each of the elements 155 being disposed on opposite sides of the associated end of the cross bar 830 and being fixedly secured thereto as by welding, whereby movement of the cross bar 830 longitudinally of the center sill 101 is restricted and cushioned by the rails 150; and more specifically, by the action of the shock-absorbers 160 resisting the movements of the rails 150 longitudinally of the center sill 101. Disposed adjacent to opposite ends of each slot 831 and mounted on the inner surface of the web 107 of the associated I-beam 104 are mountings 833 containing and holding rubber blocks 834 disposed in longitudinal alignment with the ends of the associated slot 831 to limit the longitudinal movements of the cross bar 830 along the slot 831 and to cushion the cross bar 830 at the extreme limits of the path of travel thereof, as shown in FIG. 20. The center line of the cross bar 830 in the full line representation thereof can move 21 inches in each direction to the left and to the right to the dashed line representations thereof respectively, thereby to afford a total cushioned travel of 42 inches of the cross bar 830 longitudinally of the I-beams 104, the limits of travel of the cross bar 830 being also set and cushioned by the rubber blocks 834 described above.

Connection between the lower end of the strut 803 and the cross bar 830 is effected by means of a latch structure 835 and including a laterally spaced-apart pair of latch elements 836 mounted for pivotal movement about the axis of the shaft 805. In the retracted condition of the semi-trailer hitch 800 illustrated by full lines in FIG. 18, the latch elements 836 are spaced from the cross bar 830 and are not in engagement therewith; but upon movement of the shaft 805 and the attached latch elements 836 to the left, as viewed in FIG. 18, an inclined cam surface 837 on the nose of each of the latch elements 836 engages the adjacent side of the cross bar 830 to pivot the latch elements 836 in a clockwise direction so that they ride over the cross bar 830 after which the latch elements 836 rotate under the urging of gravity in a counter-clockwise direction so that the cross bar 830 is received within notches 837 formed in the lower surfaces of the latch elements 836, thereby to interconnect the lower end of the strut 803 through the shaft 805 and the latch elements 836 to the cross bar 830 thereof. It will be understood therefore that movement of the parts of the semi-trailer hitch 800 from the retracted or storage position illustrated in FIG. 18 to the elevated or erected support position illustrated in FIG. 17 automatically connects the lower end of the strut 803 to the cross bar 830. The cross bar 830 acting through the strut 803 and the standard 802 and the fifth-wheel mechanism 810 serves to cushion the semi-trailer 700 against severe longitudinal shocks from the railway car 100, whereby the semi-trailer 700 is mounted for rolling and shock-absorbed support upon the railway car 100.

In order to move the semi-trailer hitch 890 from the erected support position illustrated in FIG. 17 to the lower retracted position illustrated in FIG. 18, it is necessary to disconnect the latch structure 835 from the cross bar 830; and, more specifically, to disengage the latch elements 836 from the cross bar 830. To this end there has been provided a linkage 822 mounted upon the strut 803 and provided with a latch actuator 823, also mounted upon the strut 803, and operable upon movement thereof to the right in FIG. 17 to move the latch elements 836 in a clockwise direction sufficiently to clear the cross bar 830. The latch actuator 823 is so positioned that it cooperates with a second abutment upon the associated road tractor 300, whereby the latch actuator 823 is automatically operated to release the latch elements 826 from the cross bar 830 upon movement of the road tractor 300 rearwardly to a position such that the fifth-wheel mechanism 304 of the road tractor 300 is in position to receive the kingpin 702 of the semi-trailer 700 from the fifth-wheel mechanism 810.

The above described construction of the hitch 800 and its connection to the rails 150 facilitates a flying transfer of the kingpin 702 of the semi-trailer 700 between the fifth-wheel mechanism 304 of the associated road tractor 300 and the fifth-wheel mechanism 810 of the hitch 800 during the loading and during the unloading of the semi-trailer 700 with respect to the railway car 100.

Considering first the method of loading the semi-trailer 700 onto the top of the railway car 100, and assuming that the hitch 800 is in the storage position illustrated in FIG. 18, the semi-trailer 700 and the associated road tractor 300 are backed onto the platforms 190, during which movement the rails 150 serve to center and properly to position the various wheels upon the platforms 190, the kingpin 702 being disposed to the right of the trunnion 801 as viewed in FIG. 17. A hook (not shown) carried by the associated road tractor 300 is connected to the standard 802 of the hitch 800, and the road tractor 300 and the coupled semi-trailer 700 are moved forwardly or to the left in FIGS. 17 and 18, so that the road tractor 300 acting through the connecting hook raises the hitch 800 from the storage position of FIG. 18 toward the erected position of FIG. 17; and when the fifth-wheel mechanism 810 is near the supporting position thereof behind the fifth-wheel mechanism 304 on the road tractor 300, the fifth-wheel mechanism 304 on the road tractor 300 is actuated to uncouple the kingpin 702 therefrom while the associated road tractor 300 is driven further forwardly pivoting further the standard 802 into its normal supporting attitude. The road tractor 300 is then driven still further forwardly so as to pivot the standard 802 into its full supporting attitude in order that the fifth-wheel mechanism 810 engages and grips the kingpin 702 and the latch structure 835 automatically engages the cross bar 830. The hook interconnecting the road tractor 300 and the hitch 800 is then disengaged, and the road tractor 300 is completely disconnected from the semi-trailer 700 and from the hitch 800 and may then be driven forwardly from the railway car 100. In view of the foregoing, it will be understood that a flying transfer is made of the support of the front end of the semi-trailer 700 from the fifth-wheel mechanism 304 carried by the rear end of the associated road tractor 300 to the fifth-wheel mechanism 810 carried by the upper end of the standard 802 of the hitch 800 carried by the railway car 100, with a continuous forward movement of the road tractor 300 along the top of the railway car 100.

As previously explained, during the operation of the railway car 100, the semi-trailer 700 mounted upon the top thereof is capable of limited longitudinal rolling movements therealong; which longitudinal movements of the semi-trailer 700 and the connecting fifth-wheel mechanism 810 take place together, and as a unit, imparting corresponding fore-and-aft movements to the hitch 800 and the consequent transmission of such fore-and-aft movements to the rails 150; whereby the shock-absorbers 160 absorb the severe longitudinal shocks effecting cushioned and limited longitudinal movements of the semi-trailer 700 in its mounted position upon the top of the railway car 100.

Considering now the method of unloading the semi-trailer 700 from its mounted position on the top of the railway car 100 and again referring to FIGS. 17 and 18, the associated road tractor 300 is backed onto the left-hand end of the railway car 100 until the rear end thereof is located immediately forwardly with respect to the hitch 800 supporting the front end of the semi-trailer 700. Upon further rearward movement of the road tractor 300, the fifth-wheel mechanism 304 thereof is moved below the front end of the semi-trailer 700 and then the two abutments thereof sequentially engage first the fifth-wheel release actuator 812 to release the kingpin 702 from the fifth-wheel mechanism 810 and then the latch actuator 823 to disconnect the latch structure 835 from the cross bar 830. The impact of the two abutments carried on the rear end of the road tractor 300 with the actuators 812 and 823 effects rotation of the standard 802 in a clockwise direction with respect to the axis of the trunnion 801, whereby the hitch 800 is moved from its erected position of FIG. 17 back into its storage position of FIG. 18 fundamentally by the action of gravity. In the movement of the hitch 800 out of its erected position, the fifth-wheel mechanism 810 disengages the kingpin 702 and immediately thereafter the fifth-wheel mechanism 304 on the road tractor 300 engages and supports the front end of the semi-trailer 700 and automatically grips and locks the kingpin 702 thereof; whereby the road tractor 300 may then be driven forwardly off of the left-hand end of the railway car 100 drawing the coupled semi-trailer 700 along therewith, so as to complete the unloading operation. In view of the foregoing, it will be understood that the rearward movement of the road tractor 300 along the top of the railway car 700 in the unloading operation described above is continuous; whereby the flying transfer is made of the support of the front end of the semi-trailer 700 from the fifth-wheel mechanism 810 carried by the hitch 800 to the fifth-wheel mechanism 304 carried by the rear end of the road tractor 300; and simultaneously, the hitch 800 is moved from its erected position of FIG. 17 back into its storage position of FIG. 18.

Referring now to FIG. 22, a modified or supplemental manner of connecting the semi-trailer 700 to the rails 150 has been illustrated, wherein the rear end of the semi-trailer 700 and particularly the axle housing 710 thereof are connected to the rails 150. Each end of the axle housing 710 has associated therewith an attachment 720 including a flexible cable 721 carrying centrally thereof a curved bearing plate 722 adapted to fit over the associated end of the axle housing 710 and carrying on each end thereof a suitable connecting member, such as a hook 723, engageable in the holes 156a of the associated rail 150. The cables 721 when connected, as illustrated in FIG. 22, provide an interconnection between the rear end of the associated semi-trailer 700, and particularly the rear axle housing 710 thereof and the rails 150 disposed therebeneath, the cables 721 serving as a tie-down arrangement and also serving to prevent transmission of longitudinal shocks from the I-beams 104 to the axle housing 710 and the connected semi-trailer 700.

In a constructional example of the railway car 100: the flanged wheels carried by the trucks 102 and cooperating with the track rails 103 are of standard rail gauge; the longitudinal distance between the striker plates carried at the opposite ends of the center sill 101 is 85 ft. 8 in.; the lateral distance between the outside edges of the top flanges 106 of the I-beams 104 incorporated in the center sill 101 is 3 ft. 3⅛ in.±¼ in.; the lateral distance between the inside edges of the top flanges 106 of the I-beams 104 incorporated in the center sill 101 is 1 ft. 5$\frac{15}{16}$ in.±¼ in.; the vertical distance between the top of the road platforms 190 carried by the center sill 101 and the top of the track rails 103 is 3 ft. ½ in.; the vertical distance between the tops of the top flanges 106 of the I-beams 104 incorporated in the center sill 101 and the tops of the road platforms 190 is 8 in.; the lateral distance between the outer edges of the road platforms 190 is 8 ft. 4 in.; and the other dimensions involved in the railway car 100 are generally related to those mentioned above in accordance with the scale of the various figures of the drawings. Furthermore, the freight container 200 has a length of approximately 40 ft. from the front end to the rear end thereof and the semi-trailer 700 likewise has a length of about 40 ft. from the front end to the rear end thereof.

In view of the foregoing it is apparent that there has been provided an improved freight transportation system including a railway car, freight containers and road semi-trailers; wherein the railway car comprises an improved shock-absorbing system involving elongated long-travel longitudinally slidable rails on the opposite sides of the frame of the railway car. The railway car also comprises a pair of hitches, each selectively operable between a storage position and an erected position. The railway car is of the universal type, whereby it may carry and transport indiscriminately the freight containers and the road semi-trailers; the railway car being arranged to mount two of the freight containers, or two of the road semi-trailers, or the combination of one freight container and one road semi-trailer. A freight container mounted upon the railway car is selectively connectible to the two rails mentioned, so as to afford shock protection to the mounted freight container. A road semi-trailer mounted upon the railway car is supported by one of the hitches mentioned in its erected position, and the one hitch in its erected position is connected to the two rails mentioned, so as to afford shock protection to the mounted road semi-trailer. The two hitches in their respective storage positions are in non-interfering relation to the movement of road vehicles (semi-trailers and road tractors) along the top of the railway car; and further, the two rails mentioned provide "inside-guiding" for the road wheels of a road vehicle in its movement along the railway car and prevent scuffing damage to the rubber tires carried by the road wheels. The shock-absorbers mounting the slidable rails upon the frame of the railway car are of improved construction and arrangement achieving long-travel of the rails in a simple and ready manner; and an improved arrangement of bearing devices is provided between the slidable rails and the frame of the railway car so that the rails are adequately supported in their sliding movements with respect to the frame of the railway car. Moreover, each of the bearing devices is of improved construction and arrangement in that it is selectively settable to provide a desired frictional drag on the movement of the associated rail, so as to control the movement thereof, and to damp undesirable oscillation of the rail upon its shock-absorbers.

While there have been described what is at present considered to be certain preferred embodiments of the invention, it will be understood that various modifications may be made therein, and it is intended to cover in the appended claims all such modifications as fall within the true spirit and scope of the invention.

What is claimed is:

1. A freight transportation system comprising a railway car and a freight container; said railway car comprising longitudinally spaced apart running gears having rail wheels, structure defining an elongated longitudinally extending narrow beam bridging said running gears and lying between the planes of the inner sides of the rail wheels of said running gears, the top of said beam defining an elongated substantially horizontal narrow central platform, a pair of elongated longitudinally extending members, and means for resiliently mounting said members respectively on the opposite outer sides of said beam for independent limited and cushioned longitudinal movements with respect thereto, said members being disposed in substantially parallel spaced-apart relation and respectively positioned adjacent to and below the opposite outer side edges of said central platform and also lying between the planes of the inner sides of the rail wheels of said running gears; said freight container comprising an elongated base adapted to be demountably carried by the top of said central platform, a first pair of laterally spaced apart depending connector elements rigidly affixed to the bottom of said base adjacent to one end thereof, a second pair of laterally spaced-apart depending connector elements rigidly affixed to the bottom of said base adjacent to the other end thereof, said two pairs of connector elements being substantially symmetrically disposed laterally with respect to the longitudinal center line of said base, the lateral spacing of each of said pairs of connector elements being only somewhat greater than the width of said central platform, whereby the individual connector elements in each of said pairs respectively project downwardly adjacent to the opposite outer sides of said central platform when said base occupies its mounted position on the top of said central platform, thereby to prevent lateral displacement of said mounted base from the top of said central platform, a first pair of latching mechanisms respectively carried by said first connector elements and selectively operative into respective latching and unlatching positions with respect to the opposite outer sides of said beam when said base occupies its mounted position on the top of said central platform, a second pair of latching mechanisms respectively carried by said second connector elements and selectively operative into repective latching and unlatching positions with respect to the opposite outer sides of said beam when said base occupies its mounted position on the top of said central platform, thereby to prevent vertical displacement of said mounted base from the top of said central platform when said latching mechanisms occupy their latching positions, and a pair of attachment elements respectively carried by said first connector elements and respectively projecting downwardly therefrom into respective attaching relations with said members when said base occupies its mounted position on the top of said central platform, whereby said members accommodate limited and cushioned longitudinal movements of said attached container relative to said central platform when said base occupies its mounted position on the top of said central platform.

2. A freight transportation system comprising a railway car and a freight container; said railway car comprising longitudinally spaced apart running gears having rail wheels, structure defining an elongated longitudinally extending narrow beam bridging said running gears and lying between the planes of the inner sides of the rail wheels of said running gears, the top of said beam defining an elongated substantially horizontal narrow central platform, a pair of elongated longitudinally extending and oppositely laterally outwardly directed flanges respectively carried by the opposite outer sides of said beam respectively at the outer side edges of said platform, a pair of elongated longitudinally extending members, and means for resiliently mounting said members respectively on the opposite outer sides of said beam for independent limited and cushioned longitudinal movements with respect thereto, said members being disposed in substantially parallel laterally spaced-apart relation and respectively positioned adjacent to and below said flanges and respectively projecting laterally outwardly beyond said flanges and also lying between the planes of the inner sides of the rail wheels of said running gears; said freight container comprising an elongated base adapted to be demountably carried by the top of said central platform, a first pair of laterally spaced-apart depending connector elements rigidly affixed to the bottom of said base adjacent to one end thereof, a second pair of laterally spaced-apart depending connector elements rigidly affixed to the bottom of said base adjacent to the other end thereof, said two pairs of connector elements being substantially symmetrically disposed laterally with respect to the longitudinal center line of said base, the lateral spacing of each of said pairs of connector elements being only somewhat greater than the lateral spacing between the outer opposite side edges of said flanges, whereby the individual connector elements in each of said pairs respectively project downwardly adjacent to the opposite outer side edges of said flanges when said base occupies its mounted position on the top of said central platform, thereby to prevent lateral displacement of said mounted base from the top of said central platform, a first pair of latching mechanisms respectively carried by said first connector elements and selectively operative into latching and unlatching positions with respect to the adjacent ones of said flanges when said base occupies its mounted position on the top of said central platform, a second pair of latching mechanisms respectively carried by said second connector elements and selectively operative into latching and unlatching positions with respect to the adjacent ones of said flanges when said base occupies its mounted position on the top of said central platform, thereby to prevent vertical displacement of said mounted base from the top of said central platform when said latching mechanisms occupy their latching positions, and a pair of attachment elements respectively carried by said first connector elements and respectively projecting downwardly therefrom into respective attaching relations with said members when said base occupies its mounted position on the top of said central platform, whereby said members accommodate limited and cushioned longitudinal movements of said attached container relative to said central platform when said base occupies its mounted position on the top of said central platform.

3. A freight transportation system comprising a railway car and a freight container; said railway car comprising longitudinally spaced apart running gears having rail wheels, structure defining an elongated longitudinally extending narrow beam bridging said running gears and lying between the planes of the inner sides of the rail wheels of said running gears, the top of said beam defining an elongated substantially horizontal narrow central platform, a pair of elongated longitudinally extending members, and means for resiliently mounting said members respectively on the opposite outer sides of said beam for independent limited and cushioned longitudinal movements with respect thereto, said members being disposed in substantially parallel laterally spaced-apart relation and respectively positioned adjacent to and below the opposite outer side edges of said central platform and also lying between the planes of the inner sides of the rail wheels of said running gears; said freight container comprising an elongated base adapted to be demountably carried by the top of said central platform, a first pair of elongated longitudinally extending and laterally spaced-apart depending connector plates rigidly affixed to the bottom of said base adjacent to one end thereof, a second pair of elongated longitudinally extending and laterally spaced-apart depending connector plates rigidly affixed to the bottom of said base adjacent to the other end thereof, said two pairs of connector plates being substantially symmetrically disposed laterally with respect to the longitudinal center line of said base, the lateral spacing of each of said pairs of connector plates being only somewhat greater than the width of said central platform, whereby the individual connector plates in each of said pairs respectively project downwardly adjacent to the opposite outer sides of said central platform when said base occupies its mounted position on the top of said central platform, thereby to prevent lateral displacement of said mounted base from the top of said central platform, a first pair of latching mechanisms respectively carried by said first connector plates and selectively operative into respective latching and unlatching positions with respect to the opposite outer sides of said beam when said base occupies its mounted position on the top of said central platform, a second pair of latching mechanisms respectively carried by said second connector plates and selectively operative into respective latching and unlatching positions with respect to the opposite outer sides of said beam when said base occupies its mounted position on the top of said central platform, thereby to prevent vertical displacement of said mounted base from the top of said central platform when said latching mechanisms occupy their latching positions, and a pair of attachment elements respectively carried by said first connector plates and respectively projecting downwardly therefrom into respective attaching relations with said members when said base occupies its mounted position on the top of said central platform, whereby said members accommodate limited and cushioned longitudinal movements of said attached container relative to said central platform when said base occupies its mounted position on the top of said central platform.

4. A railway car for transporting a freight carrier; said railway car comprising an elongated longitudinally extending frame, structure carried by said frame and defining on the top thereof an elongated longitudinally extending platform arranged in a substantially horizontal plane and adapted to support a freight carrier mounted thereon for longitudinal movements with respect thereto, an elongated longitudinally extending hollow rail, means for mounting said rail on one outer side of said frame for longitudinal movements with respect thereto, said rail projecting laterally outwardly beyond the adjacent outer side of said platform and readily accessible from the exterior and a shock-absorber housed within said hollow rail and connected between said frame and said rail, said rail being selectively connectible to a freight carrier mounted on said platform for longitudinal movements with respect thereto, whereby said shock-absorber is adapted to afford a freight carrier mounted on said platform and connected to said rail protection against the transmission thereto of severe longitudinal shocks from said frame; said shock-absorber comprising a first anchor element rigidly secured to said frame, a second anchor element rigidly secured to said rail, and at least two resilient blocks and at least one link element connected in series relation between said first and second anchor elements, each of said blocks being formed of elastomeric material and provided with opposed faces respectively securely affixed to two adjacent ones of said elements, whereby longitudinal movement of said anchor elements in either direction relative to each other subjects all of said blocks to longitudinal strains in series relation between said anchor elements and subjects each of said blocks to shear stresses between the opposed faces thereof.

5. A railway car for transporting a freight carrier; said railway car comprising an elongated longitudinally extending frame, structure carried by said frame and defining on the top thereof an elongated longitudinally extending platform arranged in a substantially horizontal plane and adapted to support a freight carrier mounted thereon for longitudinal movements with respect thereto, an elongated longitudinally extending rail having a substantially channel-shape lateral cross-section and provided with a web and a pair of flanges, means for mounting said rail on one outer side of said frame for longitudinal movements with respect thereto and with the edges of the flanges thereof disposed adjacent to said frame, said rail projecting laterally outwardly beyond the adjacent outer side of said platform and readily accessible from the exterior, and a plurality of longitudinally spaced-apart shock-absorbers housed within said rail and connected in parallel relation between said frame and the web of said rail, said rail being selectively connectible to a freight carrier mounted on said platform for longitudinal movements with respect thereto, whereby said shock-absorbers are adapted to afford a freight carrier mounted on said platform and connected to said rail protection against the transmission thereto of severe longitudinal shocks from said frame.

6. The railway car set forth in claim 5, wherein each of said shock-absorbers comprises a first anchor element rigidly secured to said frame, a second anchor element rigidly secured to the web of said rail, at least two resilient blocks, and at least one link element connected in series relation between said first and second anchor elements, each of said blocks being formed of elastomeric material and provided with opposed faces respectively securely affixed to two adjacent ones of said elements, whereby longitudinal movement of said anchor elements in either direction relation to each other subjects all of said blocks to longitudinal strains in series relation between said anchor elements and subjects each of said blocks to shear stresses between the opposed faces thereof.

7. A railway car for transporting a road vehicle provided with road wheels on the opposite sides thereof; said railway car comprising an elongated longitudinally extending frame, structure carried by said frame and defining on the opposite top sides thereof a pair of elongated longitudinally extending and laterally spaced-apart side platforms arranged in a substantially horizontal plane and adapted respectively to support the road wheels respectively provided on the opposite sides of a road vehicle mounted thereon for longitudinal movements with respect thereto, two elongated longitudinally extending rub rails, means for resiliently mounting said rub rails on said frame for independent limited and cushioned longitudinal movements with respect thereto, said rub rails being arranged in substantially parallel laterally spaced-apart relation and respectively positioned adjacent to and above the opposite inner sides of said side platforms, said rub rails being respectively provided with smooth outer rubbing surfaces respectively presented to the adjacent inner sides of the road wheels respectively provided on the opposite sides of a mounted road vehicle so as to prevent scuffing damage to the road wheels and to exert outwardly directed thrusts upon the road wheels incident to rubbing engagement therebetween with consequent limited and cushioned longitudinal movement of the engaged one of said rub rails with respect to said frame, whereby said rub rails effect inside guiding of a road vehicle carried by said frame incident to longitudinal movement of the carried road vehicle with respect to said frame, the vertical projections above said side platforms of said rub rails being substantially less than the normal road clearance of the underframe of a mounted road vehicle so as to accommodate longitudinal movements without interference of the mounted road vehicle with respect to said frame, and means including two sets of bearing devices arranged in laterally spaced-apart relation and respectively carried by the opposite outer sides of said frame and respectively positioned below and in cooperating relation with said rub rails for supporting said rub rails in their longitudinal movements with respect to said frame, each of said sets including a plurality of individual bearing devices arranged in longitudinal spaced-apart relation, each one of said bearing devices including a part mounted for rotation on the adjacent outer side of said frame and engaging the portion of the adjacent one of said rub rails disposed thereabove so as directly to support the same.

8. A railway car for transporting a freight container; said railway car comprising an elongated longitudinally extending frame, structure carried by said frame and defining on the top thereof an elongated longitudinally extending central platform arranged in a substantially horizontal plane and adapted to support a freight container mounted thereon for longitudinal movements with respect thereto, a pair of elongated longitudinally extending members, means for resiliently mounting said members respectively on the opposite outer sides of said frame for independent limited and cushioned longitudinal movements with respect thereto, said members being disposed in substantially parallel laterally spaced-apart relation and respectively positioned adjacent to and below the opposite outer sides of said central platform, a pair of attachment elements respectively carried by said members for securing in place a freight container mounted for longitudinal movements on said central platform, whereby said members afford the mounted freight container protection against the transmission thereto of severe longitudinal shocks from said frame, and means including two sets of bearing devices arranged in laterally spaced-apart relation and respectively carried by the opposite sides of said frame and respectively positioned below and in cooperating relation with said members for supporting said members in their longitudinal movements with respect to said frame, each of said sets including a plurality of individual bearing devices arranged in longitudinal spaced-apart relation, each one of said bearing devices including a part mounted for rotation on the adjacent outer side of said frame and engaging the portion of the adjacent one of said members disposed thereabove so as directly to support the same.

9. A railway car for transporting a road vehicle provided with road wheels on the opposite sides thereof; said railway car comprising an elongated longitudinally extending frame, structure carried by said frame and defining on the top sides thereof a pair of elongated longitudinally extending and laterally spaced-apart side platforms arranged in a substantially horizontal plane and adapted respectively to support the road wheels respectively provided on the opposite sides of a road vehicle mounted thereon for longitudinal movements with respect thereto, a pair of elongated longitudinally extending members, means for resiliently mounting said members respectively on the opposite outer sides of said frame for independent limited and cushioned longitudinal movements with respect thereto, said members being disposed in substantially parallel laterally spaced-apart relation and respectively positioned adjacent to and above the opposite inner sides of said side platforms, a pair of attachment elements respectively carried by said members for securing in place a road vehicle mounted for longitudinal movements on said side platforms, whereby said members afford the mounted road vehicle protection against the transmission thereto, of severe longitudinal shocks from said frame, and means including two sets of bearing devices respectively carried by the opposite outer sides of said frame and respectively positioned below and in cooperating relation with said members for supporting said members in their longitudinal movements with respect to said frame, each of said sets including a plurality of individual bearing devices arranged in longitudinal spaced-apart relation, each one of said bearing devices including a part mounted for rotation on the adjacent outer side of said frame and engaging the portion of the adjacent one of said members disposed thereabove so as directly to support the same.

10. A railway car for transporting a freight carrier; said railway car comprising an elongated longitudinally extending frame, structure carried by said frame and defining on the top thereof an elongated longitudinally extending platform arranged in a substantially horizontal plane and adapted to support a freight carrier mounted thereon for longitudinal movements with respect to said frame, an elongated longitudinally extending rail mounted on said frame for longjtudinal movements with respect thereto, a shock-absorber connected between said frame and said rail, said shock-absorber accommodating limited and cushioned longitudinal movements in either direction from a normal position of said rail with respect to said frame, and means including a plurality of longitudinally spaced-apart bearing devices for supporting said rail in its longitudinal movements with respect to said frame, said rail being selectively connectible to a freight carrier mounted on said platform for longitudinal movements with respect to said frame, whereby said shock-absorber is adapted to afford a freight carrier mounted on said platform and connected to said rail protection against the transmission thereto of severe longitudinal shocks from said frame; each of said bearing devices comprising a pair of elements respectively carried by said frame and by said rail, one of said elements being in the form of a rack and the other of said elements being in the form of an arbor, a pinion rotatably mounted upon said arbor and engaging said rack, and means carried by said arbor for selectively presetting a frictional drag upon the rotation of said pinion thereon, so as selectively to preset a corresponding frictional drag in said bearing device upon the longitudinal movements of said rail with respect to said frame.

References Cited by the Examiner
UNITED STATES PATENTS

| | | | |
|---|---|---|---|
| 2,003,582 | 6/35 | Oelkers | 213—38 |
| 2,481,575 | 9/49 | Dath | 213—22 |
| 2,944,492 | 7/60 | Clejan | 105—368 |
| 2,969,023 | 1/61 | Chapman et al. | 105—368 |
| 2,988,020 | 6/61 | Stough | 105—369 |
| 3,063,386 | 11/62 | Price | 105—368 |

EUGENE G. BOTZ, *Primary Examiner.*

LEO QUACKENBUSH, *Examiner.*